(12) United States Patent
Griffin

(10) Patent No.: US 10,027,361 B2
(45) Date of Patent: *Jul. 17, 2018

(54) DUAL-MODE COMMUNICATION DEVICES AND METHODS

(71) Applicant: Kevin Griffin, Sammamish, WA (US)

(72) Inventor: Kevin Griffin, Sammamish, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/693,459

(22) Filed: Aug. 31, 2017

(65) Prior Publication Data

US 2018/0076841 A1  Mar. 15, 2018

Related U.S. Application Data

(63) Continuation of application No. 14/466,777, filed on Aug. 22, 2014, now Pat. No. 9,755,683, which is a (Continued)

(51) Int. Cl.
*H04B 7/00* (2006.01)
*H04B 1/3827* (2015.01)
(Continued)

(52) U.S. Cl.
CPC .......... *H04B 1/3827* (2013.01); *A63F 13/34* (2014.09); *A63F 13/355* (2014.09); *H04N 5/4403* (2013.01); *H04N 21/4122* (2013.01); *H04N 21/4126* (2013.01); *H04N 21/42201* (2013.01); *H04N 21/42202* (2013.01); *H04N 21/42224* (2013.01); *H04N 21/4384* (2013.01);
(Continued)

(58) Field of Classification Search
CPC .... H04W 88/06; H04W 4/023; H04B 1/3827; H04N 4/023; H04N 21/43637

USPC .............................. 455/41.2, 127.4
See application file for complete search history.

(56) References Cited

U.S. PATENT DOCUMENTS 6,895,255 B1   5/2005   Bridgehall
9,210,358 B2   12/2015  Griffin
(Continued)

OTHER PUBLICATIONS

International Search Report and Written Opinion of the International Searching Authority dated Oct. 31, 2013, in International Patent Application No. PCT/US13/49143, 6 pages.

*Primary Examiner* — Eugene Yun
(74) *Attorney, Agent, or Firm* — Ellen M. Bierman; Lowe Graham Jones PLLC

(57) ABSTRACT

Methods, systems, and techniques for dual-mode communication are provided. Example embodiments provide an enhanced mobile device that includes a low latency transceiver and a high latency transceiver. In some cases, the enhanced mobile device is operated by a customer and configured to interact with a point of service computing system via both the low and high latency transceivers to facilitate a customer interaction at a point of service location. For example, the enhanced mobile device may transmit via its high latency transceiver an indication that it is en route to the point of service location. Upon arrival at the point of service location, the enhanced mobile device may transmit via its low latency transceiver an indication that the customer has arrived at the point of service location. The point of service computing system may then provide a service based on the information received from the enhanced mobile device.

20 Claims, 13 Drawing Sheets

Related U.S. Application Data continuation of application No. 13/934,041, filed on Jul. 2, 2013, now Pat. No. 9,781,244, and a continuation-in-part of application No. 13/934,039, filed on Jul. 2, 2013, now Pat. No. 9,357,152, and a continuation-in-part of application No. 13/934,035, filed on Jul. 2, 2013, now Pat. No. 9,210,358.

(60) Provisional application No. 61/869,000, filed on Aug. 22, 2013, provisional application No. 61/682,668, filed on Aug. 13, 2012, provisional application No. 61/675,211, filed on Jul. 24, 2012, provisional application No. 61/667,261, filed on Jul. 2, 2012.

(51) Int. Cl.

| | | |
|---|---|---|
| *A63F 13/34* | (2014.01) | |
| *H04W 4/02* | (2018.01) | |
| *A63F 13/355* | (2014.01) | |
| *H04N 21/643* | (2011.01) | |
| *H04N 21/61* | (2011.01) | |
| *H04N 21/482* | (2011.01) | |
| *H04N 21/478* | (2011.01) | |
| *H04N 21/4363* | (2011.01) | |
| *H04N 21/422* | (2011.01) | |
| *H04N 21/41* | (2011.01) | |
| *H04N 5/44* | (2011.01) | |
| *H04N 21/438* | (2011.01) | |
| *G02C 11/00* | (2006.01) | |
| *H04W 88/06* | (2009.01) | |
| *A63F 13/358* | (2014.01) | |
| *A63F 13/92* | (2014.01) | |

(52) U.S. Cl.
CPC ... *H04N 21/43637* (2013.01); *H04N 21/4781* (2013.01); *H04N 21/482* (2013.01); *H04N 21/6125* (2013.01); *H04N 21/6131* (2013.01); *H04N 21/6137* (2013.01); *H04N 21/64322* (2013.01); *H04W 4/023* (2013.01); *A63F 13/358* (2014.09); *A63F 13/92* (2014.09); *A63F 2300/204* (2013.01); *A63F 2300/534* (2013.01); *A63F 2300/538* (2013.01); *G02C 11/10* (2013.01); *H04W 88/06* (2013.01)

(56) References Cited

U.S. PATENT DOCUMENTS

| | | | |
|---|---|---|---|
| 9,755,683 B2 * | 9/2017 | Griffin | ............. A63F 13/355 |
| 2004/0242210 A1 | 12/2004 | Tagliabue et al. | |
| 2004/0259537 A1 | 12/2004 | Ackley | |
| 2007/0099703 A1 | 5/2007 | Terebilo | |
| 2008/0039089 A1 | 2/2008 | Berkman et al. | |
| 2009/0258672 A1 | 10/2009 | Camp, Jr. et al. | |
| 2009/0305789 A1 | 12/2009 | Patil | |
| 2010/0329491 A1 | 12/2010 | Johansen | |
| 2011/0001808 A1 | 1/2011 | Mentz et al. | |
| 2011/0004496 A1 | 1/2011 | Erb | |
| 2011/0243141 A1 | 10/2011 | Blackburn et al. | |
| 2011/0319073 A1 | 12/2011 | Ekici et al. | |
| 2012/0094757 A1 | 4/2012 | Vago et al. | |
| 2012/0170521 A1 | 7/2012 | Vogedes et al. | |
| 2012/0171960 A1 | 7/2012 | Oshinsky et al. | |
| 2012/0309388 A1 | 12/2012 | Moosavi et al. | |
| 2013/0044130 A1 | 2/2013 | Geisner | |
| 2013/0107129 A1 | 5/2013 | Britt, Jr. | |
| 2013/0231105 A1 | 9/2013 | Bai et al. | |
| 2013/0286004 A1 | 10/2013 | McCulloch et al. | |
| 2014/0002753 A1 | 1/2014 | Griffin | |
| 2014/0004945 A1 | 1/2014 | Griffin | |
| 2014/0364164 A1 | 12/2014 | Griffin | |
| 2016/0173677 A1 | 6/2016 | Griffin | |
| 2016/0243444 A1 | 8/2016 | Griffin | |

\* cited by examiner

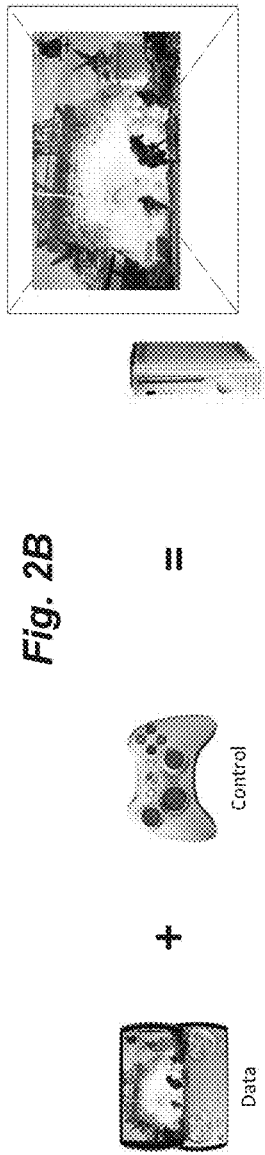
Fig. 2B
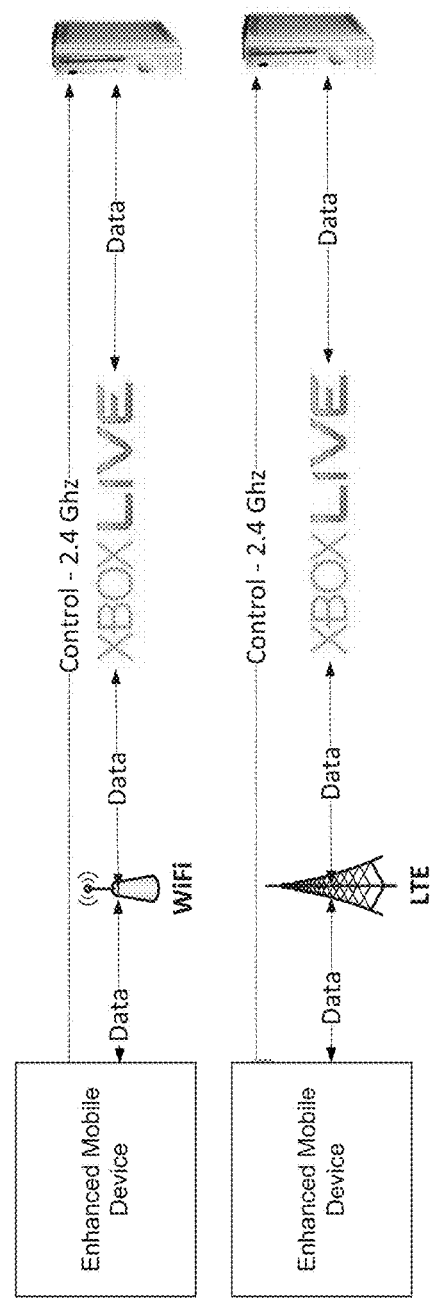
One embodiment transmits control signals via a 2.4 Ghz transmitter and communicates data messages via a WiFi or LTE network.

*Fig. 3.1*
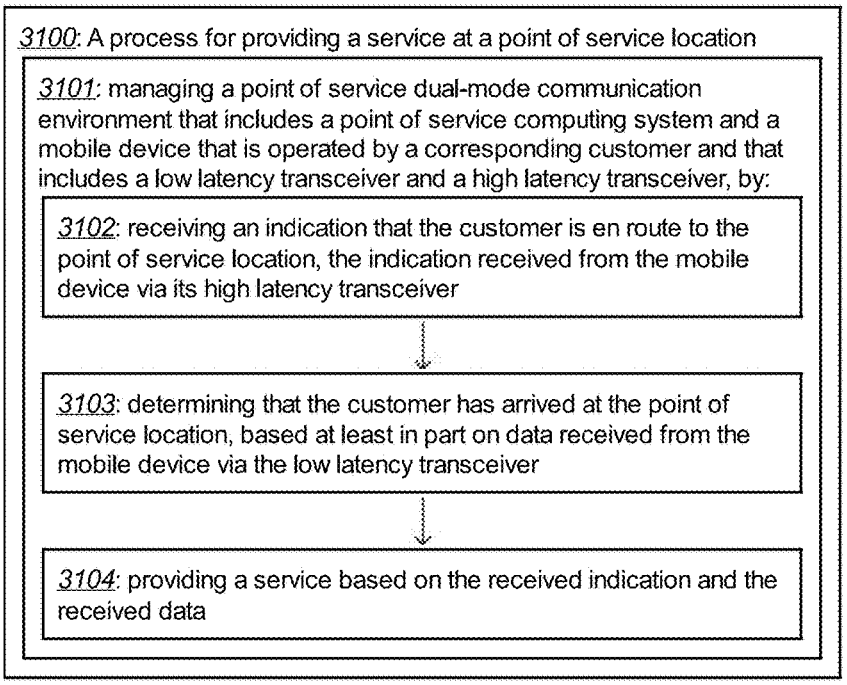
*Fig. 3.2*
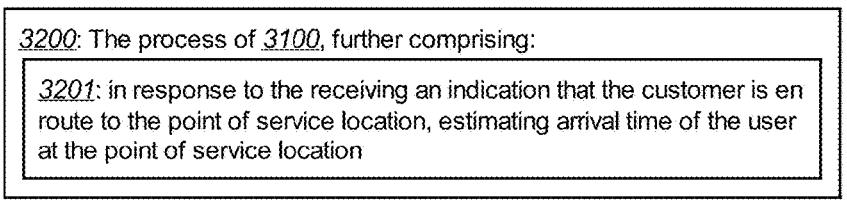

Fig. 3.3

*3300*: The process of *3100*, further comprising:

*3301*: in response to the receiving an indication that the customer is en route to the point of service location, determining an order for the customer by looking up a preferred order associated with the customer

Fig. 3.4

*3400*: The process of *3100*, further comprising:

*3401*: in response to the receiving an indication that the customer is en route to the point of service location, allocating or scheduling resources to process an order for the customer

Fig. 3.5

*3500*: The process of *3100*, further comprising:

*3501*: determining, based on a motion/image sensor, the position of the customer relative to other customers at the location

*3502*: arranging orders associated with the customers based on the determined position

*Fig. 3.6*
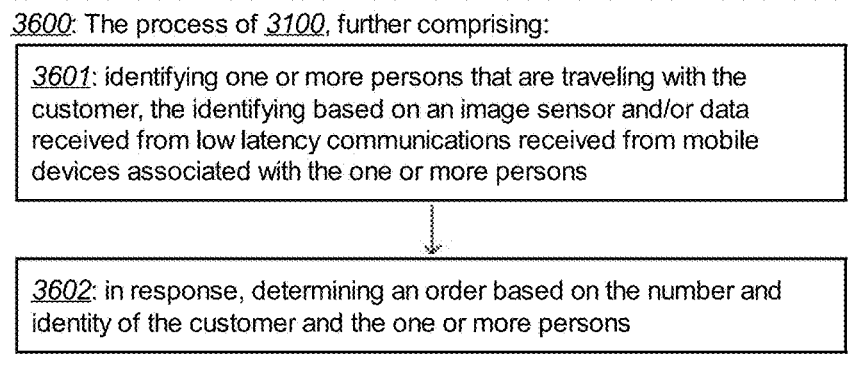
*Fig. 3.7*
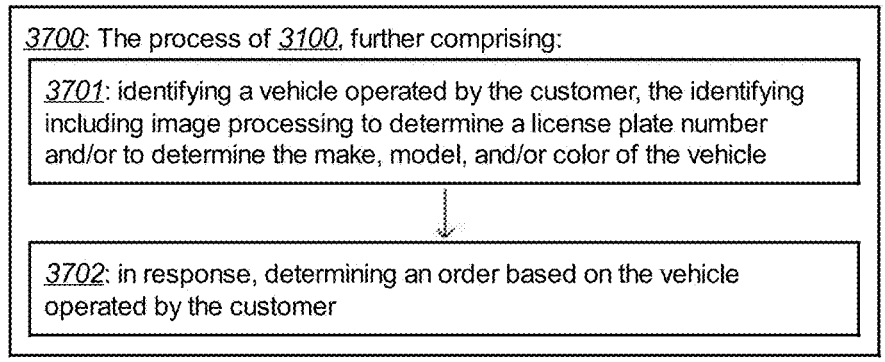
*Fig. 3.8*
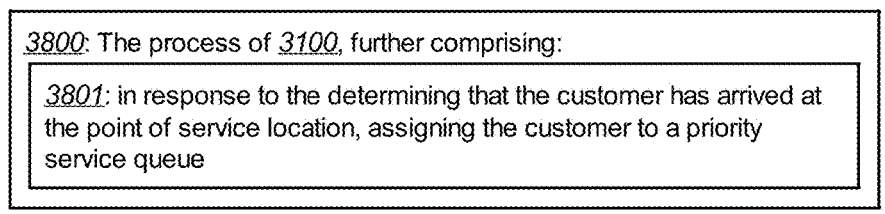

Fig. 3.9

*3900*: The process of *3100*, further comprising:

*3901*: receiving via the low latency transceiver an order and/or order confirmation from the customer

Fig. 3.10

*31000*: A process for providing a service at a point of service location

*31001*: managing a point of service environment that includes a point of service computing system, a motion/image sensor, and a mobile device that is operated by a corresponding customer, by:

*31002*: receiving an indication that the customer is en route to the point of service location, the indication received from the mobile device

*31003*: determining that the customer has arrived at the point of service location, based at least in part on data received from the motion/image sensor

*31004*: providing a service based on the received indication and the received data

DUAL-MODE COMMUNICATION DEVICES AND METHODS

CROSS-REFERENCE TO RELATED APPLICATIONS

This application is a continuation of U.S. patent application Ser. No. 14/466,777 filed Aug. 22, 2014, which claims priority from U.S. Provisional Patent Application No. 61/869,000 filed Aug. 22, 2013; U.S. patent application Ser. No. 14/466,777 is a continuation-in-part of U.S. patent application Ser. No. 13/934,041 filed Jul. 2, 2013; and is a continuation-in-part of U.S. patent application Ser. No. 13/934,039 filed Jul. 2, 2013, now U.S. Pat. No. 9,357,152 issued May 31, 2016; and is a continuation-in-part of U.S. patent application Ser. No. 13/934,035 filed Jul. 2, 2013, now U.S. Pat. No. 9,210,358 issued Dec. 8, 2015; which applications claim priority from U.S. Provisional Patent Application Nos. 61/682,668 filed Aug. 13, 2012, 61/675,211 filed Jul. 24, 2012, and 61/667,261 filed Jul. 2, 2012, all of which applications are incorporated herein by reference in their entireties.

TECHNICAL FIELD

The present disclosure relates to methods, techniques, devices, and systems for dual-mode communication between enhanced dual-mode communication client devices and computing resources, including point of service/sale systems, interactive devices, or the like.

BRIEF DESCRIPTION OF THE DRAWINGS

FIG. 2B illustrates a combination of low and high latency communication according to an example embodiment.

FIGS. 3.1-3.10 are example flow diagrams of processes performed by example embodiments.

DETAILED DESCRIPTION

Figure 1:
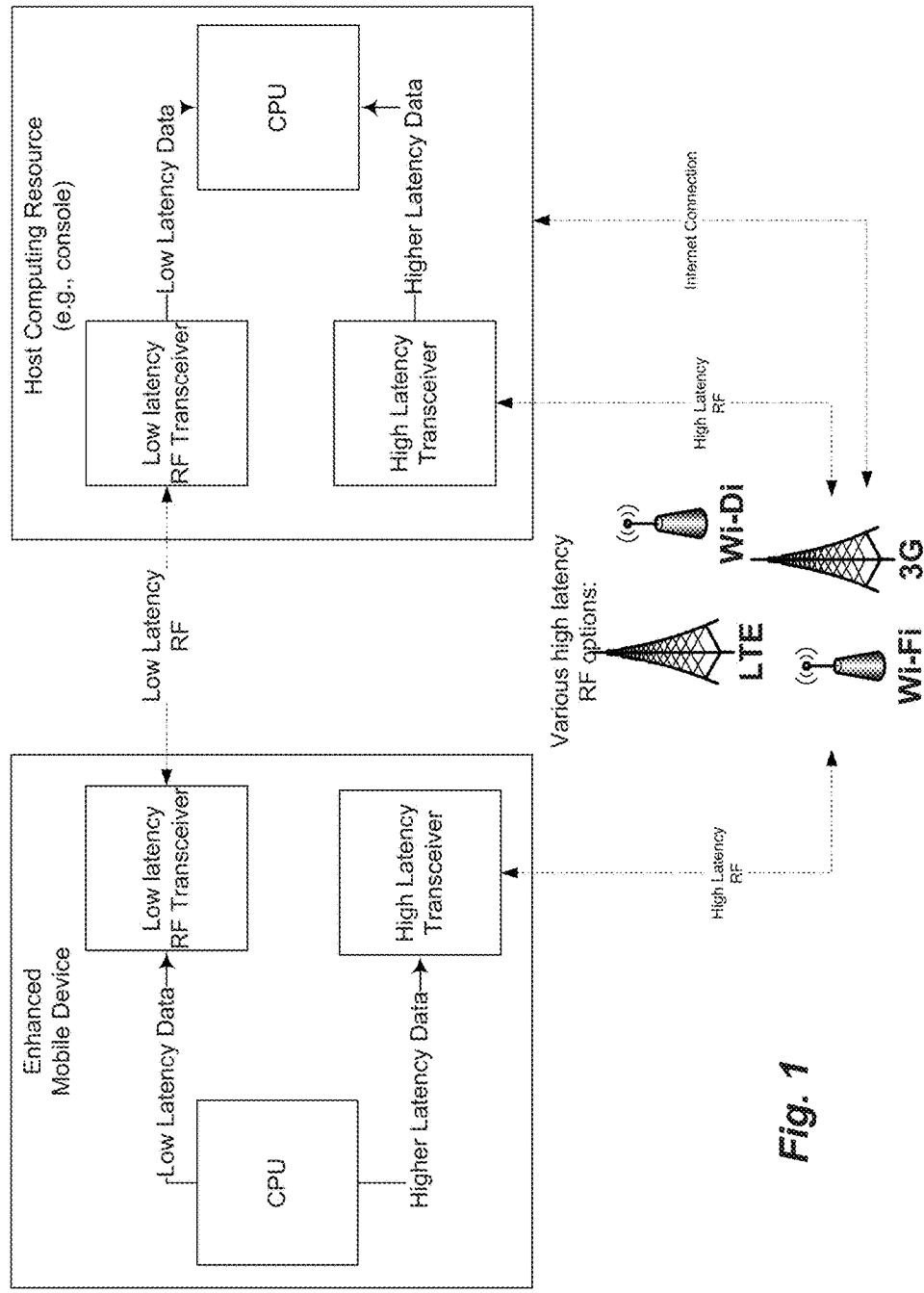
FIG. 1 is an example block diagram illustrating dual-mode communication according to an example embodiment.

The current mobile device environment lacks any kind of fast/low latency wireless connection to computing resources, including point of service/sale systems, interactive devices/systems (e.g., entertainment systems, gaming consoles, set-top boxes, kiosk systems), or the like. This deficiency stands in the way of the goal of providing a seamless wireless connected experience between smart phones (and other mobile devices) and other computing systems or resources, such as point of service systems or home entertainment systems. Latency is a measure of time delay experienced in a communication system. Latency may be measured as the time from the beginning of a transmission (e.g., a signal, packet, etc.) to the beginning of the reception of the transmission. Latency is related to response time, as a low latency connection will typically result in a lower response time and thus more interactivity. Accordingly, low latency connections are typically used or preferred where fast, highly interactive control is critical, like in a game controller. But low latency connections may have lower range (e.g., 2.4 GHz and/or Bluetooth) and/or provide less bandwidth to transmit or receive data. High bandwidth data connections, like Wi-Fi, have greater latency and do not work effectively when employed in scenarios where a game controller would be used because of the much greater latency. Higher bandwidth connections may be utilized where the amount or volume of data being sent is larger, as in megabytes, and gigabytes, but not needing low latency/faster response times.

The techniques described herein are based on dual-mode communication between two devices, systems, or modules. In some embodiments, a mobile device (e.g., a smart phone, tablet computer, smart glasses) is enhanced and/or configured to include a low latency transmitter and a high latency transceiver. The enhanced mobile device can then be used to transmit via the low latency transmitter control signals (e.g., gaming commands such as up/down, left/right) to some host computing resource, such as an entertainment console (e.g., a game system, set-top box), point of sale/service system, or the like. Typically, the low latency transceiver is short range (e.g., less than 10 meters, less than 20 meters) and low bandwidth, such as 2.4 Ghz game controller communication protocols, Bluetooth, infrared, or the like. Note that in some embodiments, the low latency transmitter may be, or be part of, a low latency transceiver, such that bidirectional low-latency communication with the host computing resource is possible. However, it is not necessary for the enhanced mobile device to have the capability to receive data over a low latency connection.

In general, a low latency communication includes any connection having a latency that is low enough to support a particular interactive experience. Thus, "low latency" may depend in part on the application or setting. For an interactive, real-time video game, a latency of up to 40 ms may be acceptable (while some games and users may require even lower latencies, such as 10 ms, 15 ms, 20 ms, or the like). For channel surfing, menu navigation, point of sale/service transactions, a latency of between 50 and 100 ms may be acceptable to provide an interactive experience. In addition, latency may be measured with respect to the communication link (e.g., the time taken for the first bit of data to arrive at the receiver), while excluding processing time by the application. If such a measurement is used, then a lower latency connection may be required, to account for application processing time. Thus, if the application processing time is 20 ms, then a maximum acceptable latency of the communication link may be lower (e.g., 20 ms to yield a total latency of 40 ms that includes application processing time of 20 ms).

Concurrently, the mobile device can communicate data (e.g., game data, image data, video data, audio data) with the host computing resource via the high latency transceiver. Typically, the high latency transceiver provides higher bandwidth than the low latency transmitter. For example, the high latency transceiver may communicate via IP over a Wi-Fi, 3G, or 4G (e.g., LTE) connection.

Using the described techniques, seamless entertainment becomes possible between a mobile device and a host computing resource. The techniques can provide experiences such as playing the same game on both a console and smart phone, controlling streaming movies on a TV from a smart phone, and transferring movies from a TV to a smart phone (and vice versa) midstream, and the like.

Note that many of the examples herein are based on a mobile device that is a smart phone enhanced to perform dual-mode communication. However, in other embodiments, other mobile devices may be similarly enhanced. Other example mobile devices include, but are not limited to, tablet computers, eBook readers, smart glasses (e.g., eyeglasses or goggles that include a display mechanism), display-enabled helmets, vehicle-based systems, heads-up display systems, and the like. In addition, the term "host computing resource" used herein includes any computing element (e.g., system, module, hardware, software) with which a dual-mode communication device interacts. The host computing resource may have local and/or remote (e.g., cloud-based, network accessible) extent. Example host computing resources include entertainment consoles, point of sale/service systems, kiosk systems (e.g., ticket machines, check-in devices), or the like. The computing resources may be located or deployed in any location or environment, including in a residential setting, retail setting (e.g., restaurant, bar, coffee shop, retail store), sale/service/pick-up portal setting (e.g., drive-through or drive-up window, ticket window, check-in counter, coat check), intake facility (e.g., doctor's office, hospital), and the like. In the following, different scenarios and embodiments are described in which different types of host computing resources are used as examples. The description of one technique in a particular scenario should not be construed as limiting. Rather, a technique described with respect to one scenario may be combined or adapted for use in other scenarios and/or with other types of host computing resources.

Introduction & Overview

FIG. 1 is an example block diagram illustrating dual-mode communication according to an example embodiment. FIG. 1 illustrates an enhanced mobile device that includes a CPU, a low latency transceiver, and a high latency transceiver. The enhanced mobile device is in communication with a host computing resource (e.g., a console) via both the low latency transceiver and the high latency transceiver. The host computing resource also includes a CPU, a low latency transceiver, and a high latency transceiver. Note that in some embodiments, the low latency communication between the enhanced mobile device and the host computing resource is one-way or unidirectional. That is, the enhanced mobile device may only be able to transmit to (and not receive from) the host computing resource via the low latency communication connection/link. Furthermore, the low latency connection may not rely on handshaking or similar operations, such as may be required to set up or tear down a TCP/IP connection.

Dual-mode wireless communication according to some embodiments includes at least some of the following features:
- Utilize existing host computing resource 2.4 GHz wireless connection or Bluetooth schema for control commands, such as may be present in a game console or other interactive device
- Typical control commands may include existing console controller commands such as: dual analog stick movement (up/down, left right, push), d-pad (8 way digital control pad), action input buttons, adjustable analog triggers, start and back buttons, power or command button.
- Device control commands, sensors, or input devices become available to the console. These console control commands may include: smart phone touch screen and (soft) keyboard inputs, tilt, bank, motion (e.g., accelerometer, magnetometer, gyroscope), compass/direction, GPS/AGPS, camera aiming. Also, future device control commands similar to Microsoft's Kinect sensor could be built into a device for 3D gaming.
- Feedback from the host computing resource sent back to the enhanced mobile device over the low latency connection may include low response time feedback such as a vibration signal sent to the device (e.g., to signal when the user collides with an object in a driving game).
- Utilize Wi-Fi, 3G, 4G (e.g., LTE), or future data connections for high bandwidth data transfer.
- Example uses for data transfer include: 2nd (or 3rd, 4th, etc.) screen display for a game being played where the 1st screen may be a TV connected to a console (or vice versa), metadata relevant to a game being played on the main console connected TV, soft controls (graphically display on the device screen) that change relevant to a level of a game, options available at certain points in a game, a game map that updates as the player moves, metadata relevant to a movie or other video program being watched on the main screen, mobile user profile storage, and also used to map an area around the user by utilizing the device camera to input the visual setting around the user. Voice commands or other input can also be transferred via data to the console.

In some embodiments, low latency communication is provided via a 2.4 GHz and/or Bluetooth connection schema or protocol. For example, in the case of Microsoft Xbox 360, a proprietary 2.4 GHz game controller protocol is used. For Nintendo Wi and Sony PS3 consoles, Bluetooth is utilized. The term "Bluetooth" may include current and future versions of the proprietary open protocol for creating short range personal area networks, communicating in the 2.4-2.48 GHz range, using frequency hopping spread spectrum techniques utilizing 79 channels of 1 MHz each. In some cases error checking (e.g., Extended Synchronous Connections) may be utilized, although in some embodiments some error checking protocols may not be used to reduce latency.

Some embodiments include multiple low latency transmitters (or transceivers). For example, the enhanced mobile device may include both a Bluetooth transceiver and an infrared transmitter. In such cases, the enhanced device may include logic to determine which of the multiple transmitters to use. For example, the enhanced device may preferentially utilize one transmitter until it has reached or is near its capacity, and then transmit overflow data via the other transmitter. As another example, the enhanced device may seek to divide or balance the transmission load between the two (or more) transmitters. In some embodiments, the choice of transmitter to use may be exposed to the game application or other software, so that an application developer may control which transmitter to use.

In some embodiments, control commands (and other signals, messages, or data needing a low latency connection) are separated from more data intensive examples (mentioned above) by logic executing on the CPU. Control commands are converted to protocol format for transfer across the 2.4 GHz game controller or Bluetooth band. The enhanced mobile device then employs its 2.4 GHz game controller or Bluetooth transmitter to send a signal in the protocol format specified. On the other end, the host computing resource receiver receives radio waves emitted by device receiver and the data in protocol is converted by CPU to perform commands with respect to an application or other function/code performed by the host computing resource. In reverse, if the host computing resource needs to send fast, low latency data to the enhanced mobile device, it can do so over the same connection as both the device and host computing resource may have transmit and receive functionality.

In some embodiments, when the enhanced mobile device or host computing resource CPU determines or identifies data that is of a non-control type suitable for transmission by a higher latency, higher bandwidth connection like Wi-Fi, LTE, or 3G, (or a future high bandwidth data connections), it converts the data to the specified protocol format required for transfer across the higher bandwidth connection. This higher bandwidth data is received by the corresponding high latency receiver and employed to perform higher bandwidth, higher latency activities of the type described above.

Figure 2A:
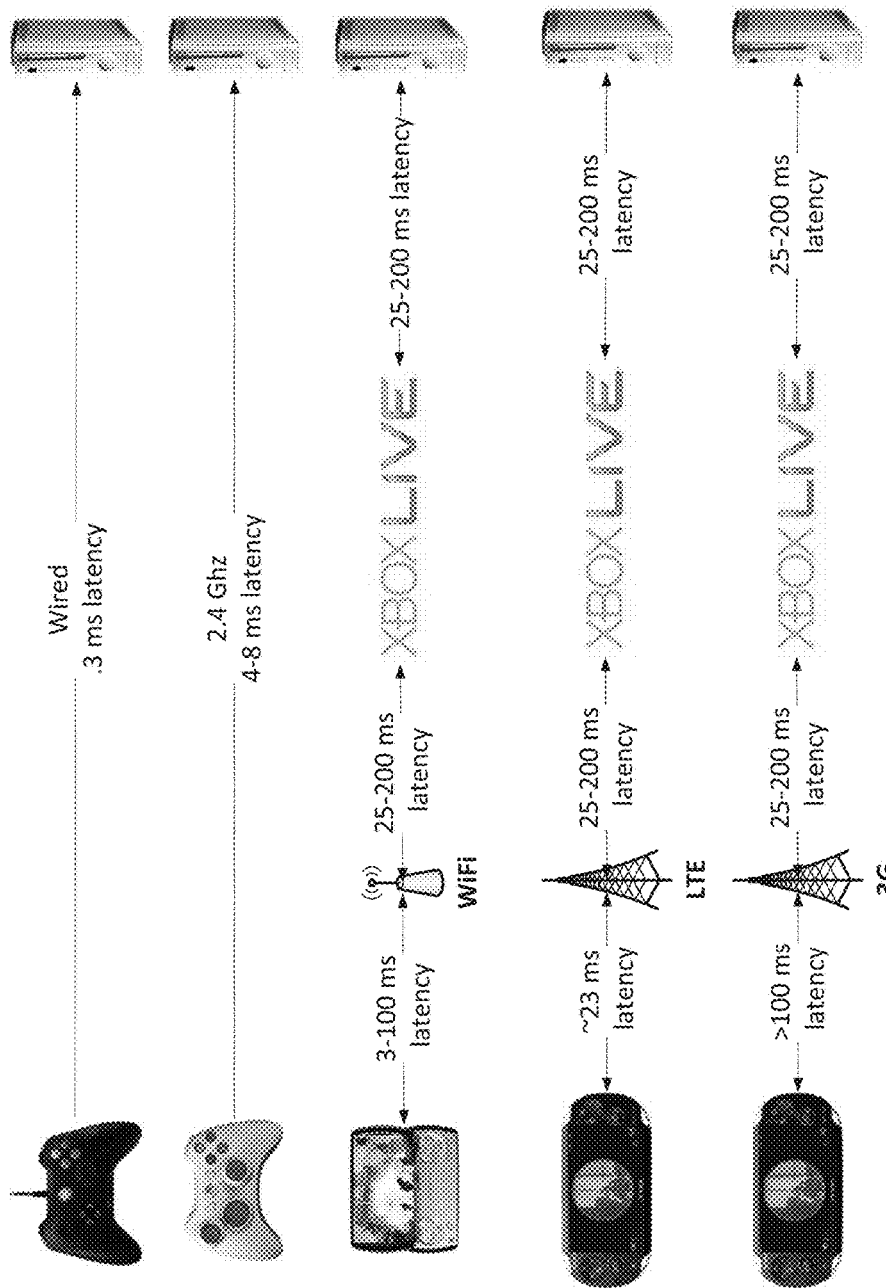
FIG. 2A compares latency of various communication mechanisms.

FIG. 2A compares latency of various communication mechanisms. In particular, FIG. 2A compares the latency of example wire-based communication between a game controller and an example host computing resource that is a game console (0.3 ms) and example direct 2.4 GHz wireless communication between a game controller and a game console (4-8 ms). While the latency of direct wireless communication is greater than that of wire-based communication, it is still low enough to play highly interactive video games.

FIG. 2A also compares the latency of various indirect, high latency communication approaches between a mobile device (e.g., smart phone) and the game console. The compared approaches all utilize a Wi-Fi or cellular network in addition to various intermediary devices (e.g., a wireless router) or systems (e.g., cellular network). In particular, FIG. 2A compares the latency of communication between a mobile device and a game console via a Wi-Fi network, an LTE network, and a 3G network. In this example, Wi-Fi provides the lowest latency of the three approaches—about 53 ms in the best case (the sum of 3 ms from smart phone to wireless router, 25 ms from router to intermediary system, 25 ms from intermediary system to game console). However, this best-case latency far exceeds that required to provide an enjoyable interactive gaming experience.

FIG. 2B illustrates a combination of low and high latency communication according to an example embodiment. FIG. 2B shows how low and high latency communication may be combined in example embodiments. In particular, low latency control-oriented communication is performed via a 2.4 GHz mechanism, and high latency data-oriented communication is performed via a Wi-Fi or LTE network. By incorporating both communication mechanisms in a single enhanced mobile device, the enhanced mobile device may be employed to provide an enjoyable, interactive gaming or viewing experience.

Figure 2C:
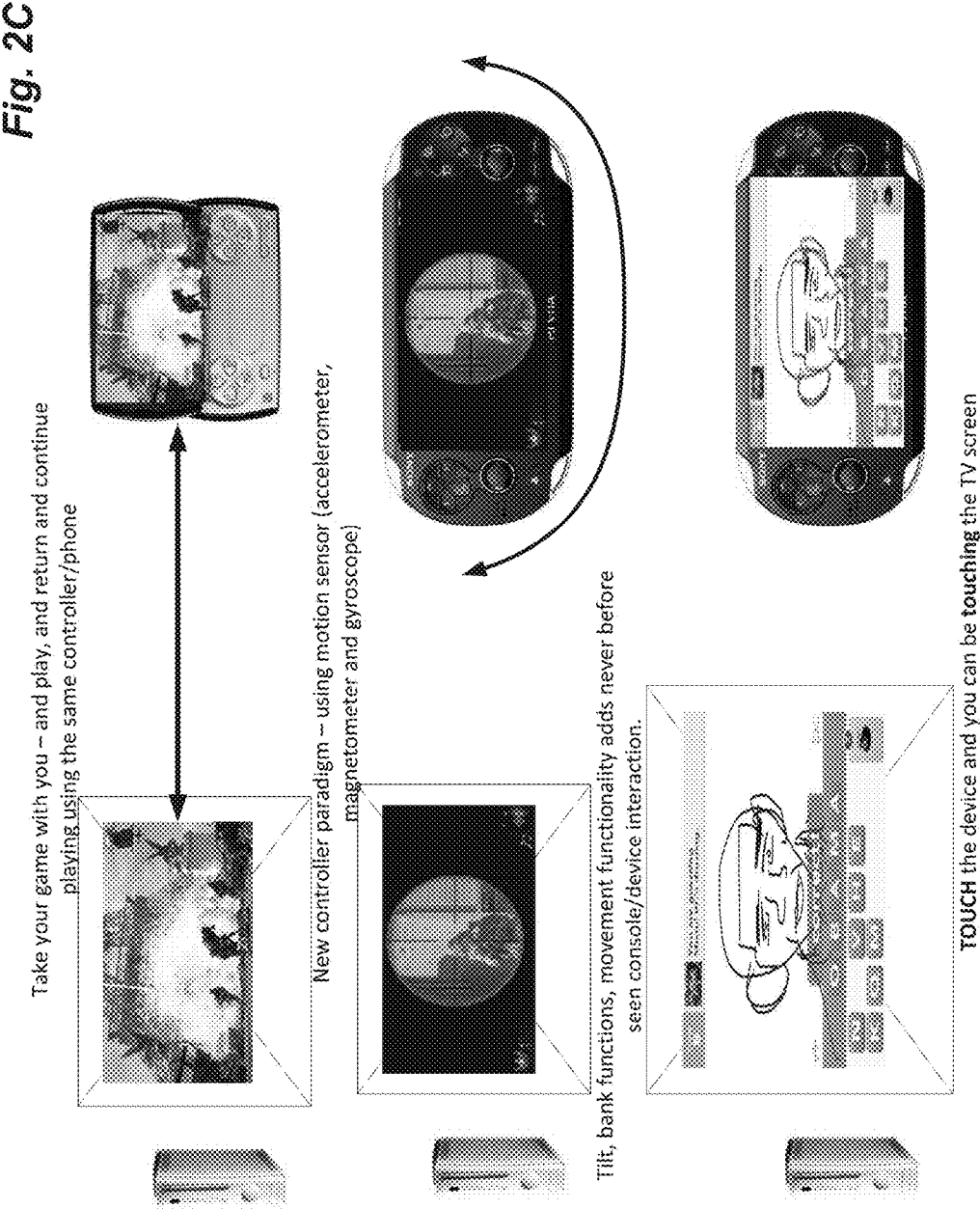
FIG. 2C illustrates advanced gaming scenarios facilitated via dual-mode communication according to an example embodiment.

FIG. 2C illustrates advanced gaming scenarios facilitated via dual-mode communication according to an example embodiment. In particular, FIG. 2C illustrates game or program portability, new controller paradigms (e.g., using advanced sensors of mobile devices, such as accelerometers and gyroscopes), and remote touch screens (e.g., touching a screen of a mobile device is translated to a "touch" or input to a remote television or other display).

The described techniques may bring a new level of precision and accuracy to gaming applications. Current tilt-based gaming uses only the accelerometer, resulting in an imprecise record of motion, which while still fun, is noticeably coarse in the level of control afforded. However, with the addition of a gyroscope together with high-precision sensor fusion and calibration, games can be controlled in a more precise and granular fashion, enabling more advanced tilt- and twist-based games. This has proved popular with both advanced and casual golfers, as advanced motion can track the speed and arc of your swing, as well as the angle of the club face, and is therefore able to provide a very accurate replication of your golf shot, with distance, elevation hook and slice all accounted for accurately. In addition, advanced motion technology can enable your phone to be used to control game consoles and other gaming devices.

Arena Gaming

Figure 2D:
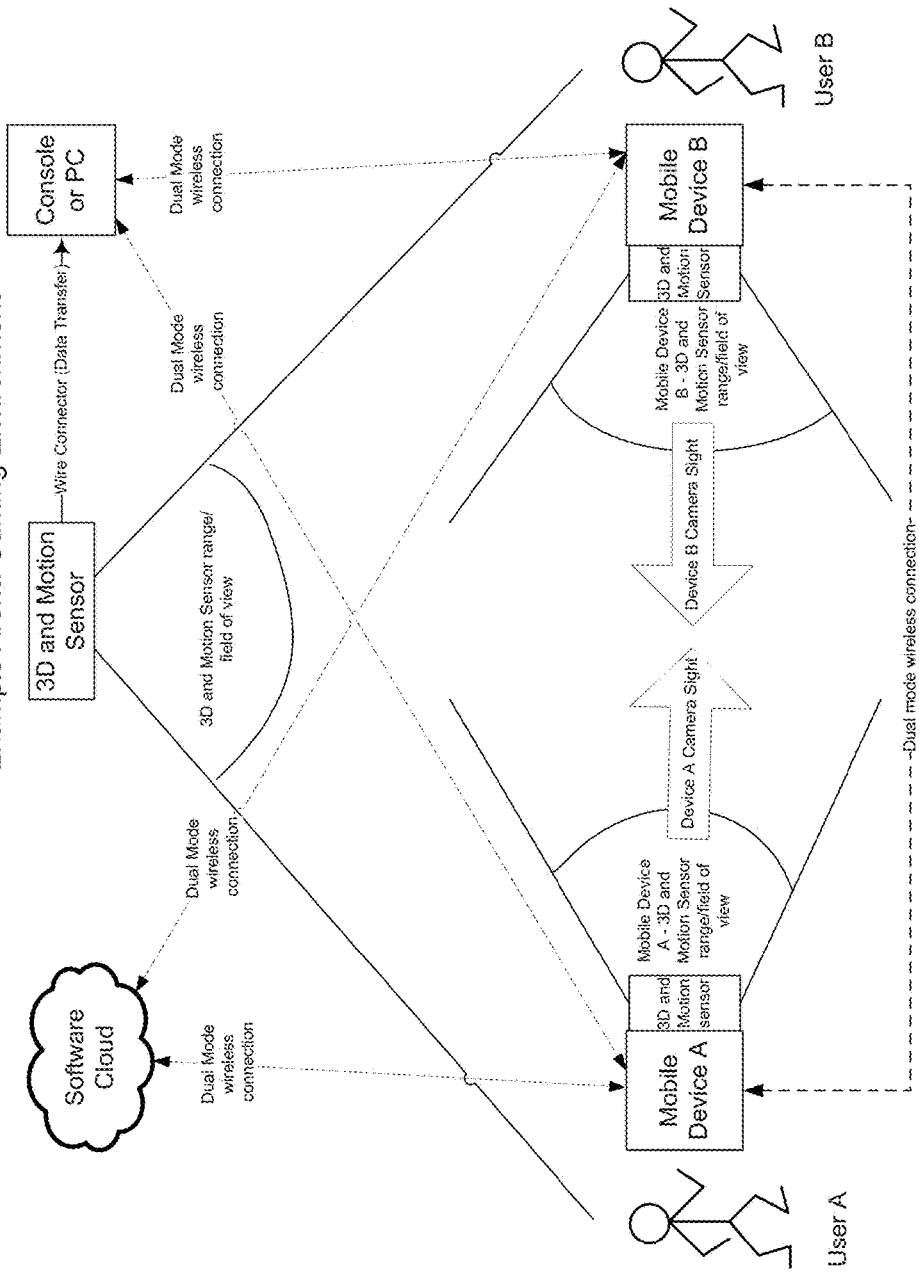
FIGS. 2D and 2E illustrate an example arena gaming environment according to an example embodiment.
Figure 2E:
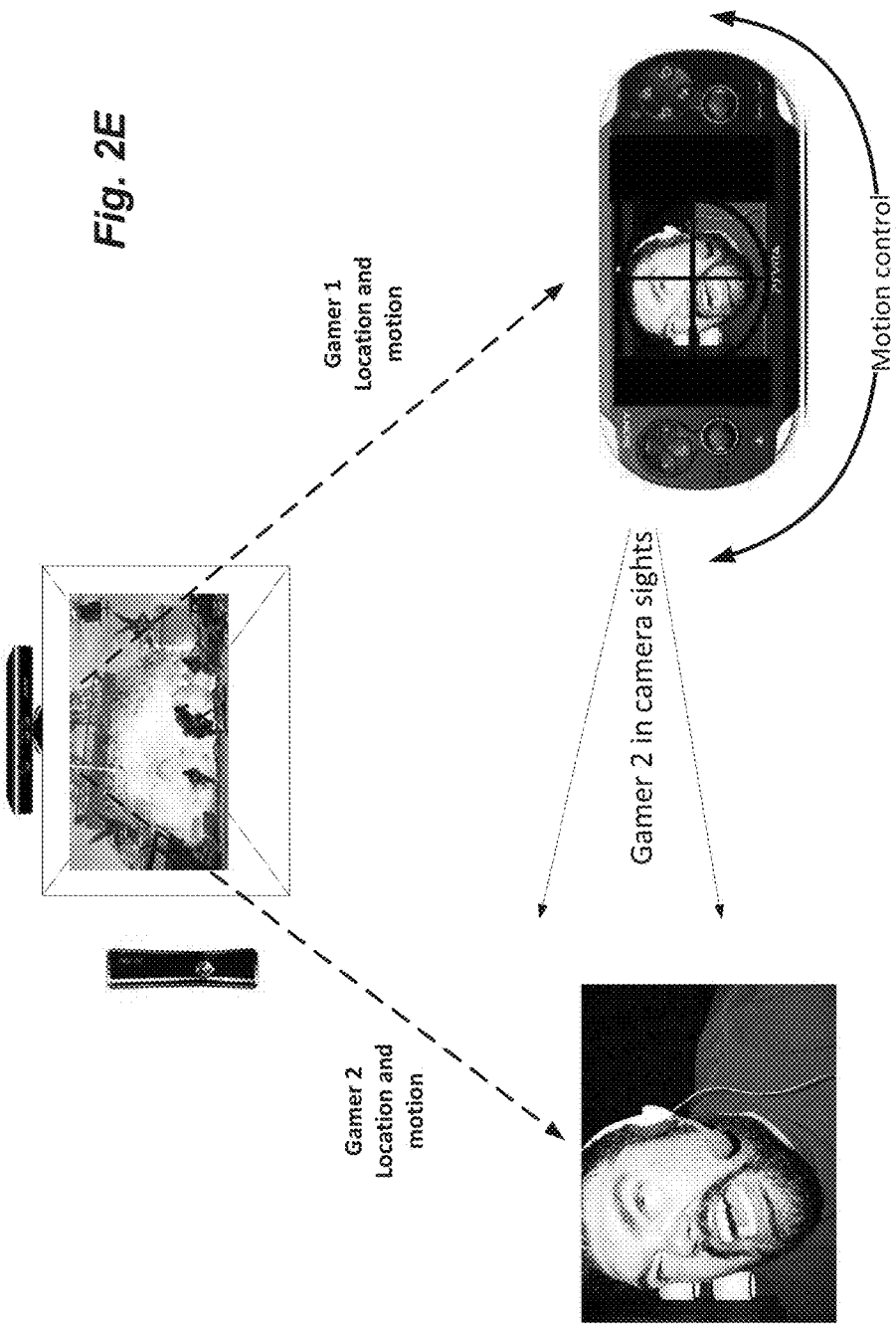

FIGS. 2D and 2E illustrate an example arena gaming environment according to an example embodiment. In some embodiments, enhanced mobile devices as discussed herein may be used by multiple users to engage in interactive, immersive, real time, multi-player video game experiences.

The advent of motion controllers and motion sensors in console, PC and mobile gaming has transformed entertainment from a static, "sit on the couch" environment to an interactive movement-based paradigm. The user's movements are sensed by the platform (e.g., console, PC, mobile) and translated into movements displayed by entertainment software or application on a screen. Jumping, dancing, lunging, waving arms, and the like, are all sensed and interpreted into movement in a game or application.

The existing gaming paradigm typically includes one of more users interacting directly with the TV or device via the methods above. What is absent is the ability for users who are proximately situated (e.g., present in the same room or other enclosed space) to interact with each other. For example, given a first and second player who are in the same room, there is no way for the player to shoot at, throw a ball to, or otherwise direct game play towards, the second player by aiming a controller at the second player.

By combining motion sensing and/or 3D sensing functionality with enhanced mobile devices having dual-mode communication capabilities as well as enriched sensors, such as cameras, gyroscopes, compasses, and the like, the concept of multi-user arena gaming becomes possible. The techniques described below combine motion/3D sensing with enhanced dual-mode mobile devices to provide an arena gaming environment where many users can engage in game play by interacting with the environment around them as well as each other.

Enhanced dual-mode mobile devices facilitate an interactive, real-time arena gaming experience for multiple players due to their advantageous communication properties. In particular, a dual-mode mobile device can use its low latency connection to communicate with a gaming system (e.g., console or PC) and/or with other proximately located mobile devices. The low latency connection may be used to communicate sensor data (e.g., from an accelerometer) to the gaming system and/or another mobile device.

In some embodiments, adding 3D/motion sensing to the enhanced mobile device allows a user to "see" the other user's motions. For example, an enhanced mobile device that includes motion sensing may be operated by user A to target user B, even when user B does not operate an enhanced mobile device, because user A's mobile device alone is capable of sensing user B's position and movements. In other scenarios, of course, both users A and B may operate similar enhanced mobile devices. In addition, by situating motion sensing on a mobile device, players need not be in proximity to a motion sensor associated with a game console or other gaming system. For example, they may be in a different room. Furthermore, situating motion sensing on a mobile device may reduce latency, because the mobile device need not wait to receive position/motion information from a remote system.

Note that while several of the examples described herein are based on two players or gamers, typical embodiments are capable of facilitating arena gaming amongst more than two players. Also, some embodiments may include multiple motion sensing and/or 3D sensing devices to create a larger arena area than would be covered by a single sensor. In general, arena area may be expanded or enlarged by adding additional sensing devices. Each sensing device may communicate (e.g., via wireless connection) information about its local area back to the console or PC that is managing the game. Furthermore, some embodiments may be able to link multiple distinct arenas to provide a distributed gaming experience. For example, a first arena (e.g., a living room in a first house) hosting a first group of three players may be linked with a second arena (e.g., a gymnasium) hosting a second group of six players, such that players of the first group can interact with each other as well as players of the second group, and vice versa.

FIG. 2D depicts one arena gaming example. In the illustrated example, a user operating Device A is interacting with another user operating Device B. Various actions, such as a dive (to avoid a shot fired at them), a sideways movement (to avoid a punch), a throw (say of a hand grenade), a catch, a throw, or the like, are all sensed by Device A's 3D/motion sensing features. Combined with Device A's onboard mobile device capabilities; touch screen and (soft) keyboard, tilt, bank, motion (e.g., accelerometer, magnetometer, gyroscope), compass/direction, GPS/AGPS, camera aiming, it is possible to have Device A "lock on" to User B with a scope and fire at them very accurately.

Mobile devices in typical form factors (e.g., smart phone, pad or smart controller) have immediate immersive arena entertainment possibilities. New mobile form factors, such as goggles, provide an even more immersive arena experience where the user is looking through a screen to sight a target and head or eye movements are translated via dual-mode communication functionality to a PC, console, or other mobile device or gaming system.

In one embodiment, arena gaming utilizes one or more enhanced mobile devices communicating sensing and translating movement of both the mobile device, other potential users (targets) or the environment to form an immersive arena experience. A CPU on one or more of the device, the console/PC, or cloud software (or combination of) then interprets the controls below and provides feedback to the user via graphics, sound, vibration in a software program running on the PC/Console, mobile device or cloud. Some embodiments of arena gaming utilize the herein described dual-mode communication functionality to immerse the user.

Typical control commands include existing console controller commands such as: dual analog stick movement (e.g., up/down, left right, push), d-pad (e.g., 8-way digital control pad), action input buttons, adjustable analog triggers, start and back buttons, power or command button. These device control commands/inputs may also become available to the console, the cloud, and/or other gaming systems. These console control commands may include one or more of: smart phone touch screen and (soft) keyboard, tilt, bank, position/orientation/motion (accelerometer, magnetometer, gyroscope), compass/direction, GPS/AGPS, camera aiming, and the like.

As noted the low-latency connection may be used between a console and a mobile device and/or between multiple mobile devices themselves. Feedback from the console sent back to the device over the low latency connection typically includes low latency feedback such as a vibration signal sent to the device when the user might hit something when driving a car in a game. Control commands or sensor inputs from one device may also be directly shared with other mobile devices, so that other mobile devices can accurately represent or render the position, orientation, or other properties of other users/devices.

In addition, arena gaming may utilize the dual-mode capability of enhanced mobile devices for high bandwidth data transfer. Typical uses for high bandwidth data transfer include: 2nd (or 3rd, 4th, etc.) screen display for a game being played where the 1st screen could be a TV connected to a console (or vice versa), metadata relevant to a game being played on the main console connected TV, soft controls (graphically display on the device screen) that change relevant to a level of a game, options available at certain points in a game, a game map that updates as the player moves, metadata relevant to a movie being watched on the main screen, mobile user profile storage, and also used to map an area around the user by utilizing the device camera to input the visual setting around the user. Voice can also be transferred via data to the console.

As mentioned above, an arena or other gaming environment may be mapped by a user's camera on a mobile device, where the data would be sent by high bandwidth connection to device/console and/or cloud. Also objects and other users could be mapped by the user's camera in high detail and sent via high bandwidth connection. Once mapped, software present on the mobile device can sense changes in the arena environment when input from motion and depth sensing sensors detects changes.

Embodiments of arena gaming utilize one or more mobile devices communicating, sensing, and translating movement of both the mobile device, other potential users (targets), and/or objects in the environment (e.g., chairs, walls, obstacles, tables, pets) to form an immersive arena experience. A CPU on the device, the console/PC, and/or cloud software (or combination thereof) then interprets the controls and provides feedback to the user via graphics, sound, vibration in a software program running on the PC/Console, mobile device or cloud.

Referring again to FIG. 2D, a surface (x/y) area map is depicted and shows user A depicted by mobile device A. The previously described dual mode high and low latency connections are depicted as streaming to and from the device and labeled with "Dual Mode wireless connection." Streaming of (low latency) control and high bandwidth data can be to/from the cloud, console/PC, or another device via high bandwidth wireless connectivity and/or internet. Note that the presence of the label "Dual Mode wireless connection" should not be interpreted to mean that the use of both low and high latency connections are required as between two endpoints in all embodiments. For example, in some embodiments, two mobile devices may only communicate with one another using the low latency connection, may communicate with the cloud using only the high latency (high bandwidth) connection, and communicate with the console using both the low and high latency connection.

In FIG. 2D, a console or PC is associated with a 3D and motion sensor. The motion sensor may in other embodiments be incorporated as part of the console or PC. FIG. 2D also depicts mobile devices A and B as in range of each other and the console. When used in conjunction with a console or PC sensor, the movement and motion of device A can be tracked in 3D a given distance from the sensor providing the sensation of the user moving around a set arena. In some embodiments, multiple consoles, PCs, and/or 3D/motions sensors may be deployed. For example, a house or other residence may be configured to include a 3D motion sensor in each of the living room, recreation room, and basement, where all of the motion sensors are linked to a common console or PC.

When used without a console or PC sensor (or when players are out of range of the sensor), the mobile device(s) may be employed to track each other's movement and motion relative to each other. As one or more of the mobile devices may be in motion, the advantage of the console/PC sensor providing a fixed arena may be lost, and the devices may then move relative to each other in a virtual arena. Arena boundaries and objects that may be mapped in a static arena may become more difficult to track relative to the other device, thus interaction with a console/PCs sensor is preferred for some applications.

Mapping and aiming are facilitated by some embodiments. For example, as device A is moved around a fixed space on an X/Y/Z axis, this movement is tracked and mapped by either a console/computer 3D/motion sensor and/or the device. As the mobile device is pointed to a direction in space defined by the X/Y/Z axis, the device's own onboard 3D depth/motion sensor is able to map objects in space such as ceilings, wall, furniture, tables, etc. The console/PC tracks the location of the device based on both its own 3D/motion sensor and the device's onboard accelerometer and GPS. The console/PC further tracks the orientation (e.g., direction pointed) of the mobile device, 3D mapping information sent from the mobile device to the console/PC may be used to accurately determine a model of the arena boundaries, obstructions, and the like.

When additional mobile devices enter the mapped arena, their positions relative to objects, boundaries and other mobile devices are accurately sensed by the console/PC 3D/motion sensor and/or their own onboard 3D/motion sensors. The mobile devices can sense changes in the arena environment, based on inputs from motion and depth sensing sensors that detect changes. Also, mobile devices can be aimed and/or zoomed at other mobile devices, with information about such actions being shared with other devices or the gaming system. In response, the gaming system can update a game model or other representation of player locations and other information about the arena gaming environment.

In addition, some embodiments perform auto-detection of new players who enter the gaming arena. For example, when a third player enters the arena depicted with respect to FIG. 2D, his mobile device may be detected by the console. Detection may be based upon the presence of signals transmitted by the mobile device of the third player, such as a Wi-Fi, Bluetooth, infrared, or other signal. In some embodiments, the console may periodically poll for new devices within the arena. When the console detects the newly arrived mobile device, it causes the device to display a prompt and/or other user interface elements that may be used by the player to enter or otherwise join the current arena game.

Some embodiments support "smart glasses." In particular, with the advent of glasses/goggles technology with built in screens, a highly immersive arena experience is provided when leveraging the above techniques in the manner specified. With glasses functioning as the mobile devices depicted in the Figures, an arena gaming scenario is readily presented. Additionally adding gun type handheld mobile devices, control inputs from the user for aiming and triggering shots, gaming arena scenarios are obvious.

Using the described techniques, some embodiments provide augmented reality or virtual reality experiences for users. With respect to virtual reality, an embodiment that uses smart glasses may immerse a player in a substitute (virtual) reality, in which the information presented via the glasses operates as a replacement for visual signals from the physical environment of the player. With respect to augmented reality, some embodiments may modify, add, incorporate, or otherwise augment views of the physical environment with game-related information, such as indications of friend or foe, weapons or other game objects possessed by other users, indications of game actions, and the like.

FIG. 2E illustrates additional aspects of an arena gaming embodiment. FIG. 2E illustrates the use of a mobile device to aim or otherwise sight another user in an arena gaming context. Note that a game user interface element (e.g., cross hairs) is superimposed upon an image/video obtained from the device camera in order to merge the gaming experience with real-world image data obtained from the camera sensor.

Note that arena gaming embodiments may be deployed in various types of public and/or private establishments or locations. Some embodiments may operate in a residential setting, such as within a living room. Other embodiments may operate in a public commercial setting, such as in a location (e.g., a warehouse) that has been configured to host arena gaming tournaments. Other commercial settings may include restaurants or bars. For example, a bar may host an arena game for players wishing to engage in a trivia game, games of chance, sporting simulations, or the like.

In addition, the described techniques need not necessarily be employed in the "gaming" context. For example, at least some of the described techniques can be used in a retail sales or services application, as described further with respect to FIG. 2G, below.

Dual-mode Eyeglasses

This section describes wearable computing eyeglasses and accessories, and how those accessories sense and communicate 3D depth, motion, camera sighting and various other control movements typically requiring a low latency connection, as well as higher latency/higher bandwidth data transfer and how those work together to provide a compelling entertainment experience. Wearable computing eyeglasses having dual-mode communication capability are herein sometimes also referred to as "dual-mode eyeglasses," "dual-mode glasses," "enhanced eyeglasses," "smart glasses," or similar.

Dual-mode glasses according to some embodiments can be considered an example of an enhanced mobile device (as described herein), where the user is able to view through a translucent screen, in the same way a heads up display ("HUD") typically operates. Viewing data projected on a translucent or transparent screen is commonly referred to as "augmented reality." There are existing augmented reality glasses but they typically do not contain full mobile device functionality, much less the described dual-mode communication capability.

As with other types of mobile devices, in order for wearable computing glasses to change the face of gaming, arena gaming, or entertainment in general, certain control commands are preferably transferred via low latency connections. Other data can be transmitted and received via higher latency, higher bandwidth wireless connection (e.g., Wi-Fi, 3G, 4G, LTE, Wi-Di).

By enhancing eyeglass-based displays/devices with a dual-mode wireless communication solution, seamless entertainment becomes possible between the user and the console, television, PC, or cloud computing services. Dual-mode glasses facilitate experiences such as playing the same game on both a console (with display) and glasses, controlling streaming movies on the user's television from his glasses, and porting or transferring an experience (e.g., a movie or game) from a display (e.g., television, laptop, personal computer monitor) to the eyeglasses (or vice versa), and the like.

Because the described wireless solution is dual mode—meaning it uses a low latency band for control (e.g., up/down, left/right, forward/back, etc.) and a higher bandwidth (but higher latency) connection for data transfer—an entirely new connected experience paradigm becomes possible when using dual-mode glasses. For example, when using dual-mode glasses, the user can look through a translucent HUD screen to sight a target, or select a menu item. In addition, head and/or eye movements may be translated and then transmitted via dual-mode connections to a PC, console, cloud or other mobile device.

Example dual-mode glasses may utilize existing console, PC or set top box 2.4 GHz wireless connection or Bluetooth schema for control commands, which need to be sent via the low latency connection. Typical control commands are existing console controller commands such as: dual analog stick movement (e.g., up/down, left right, push), d-pad (e.g., 8-way digital control pad), action input buttons, adjustable analog triggers, start and back buttons, power or command button, or the like. Since the glasses themselves lack a console controller stick, d-pad, triggers, and the like, generation of these low-latency console controller commands for transmission can be via various mechanisms, described below.

- Tracking eye movements—by placing a motion sensor facing the eyeball, the eye movements up/down, left/right may be sensed and transmitted. Eye blinks and eye movement with eyelid closed could also be interpreted as above control commands.
- A soft pad may be attached to the glasses where the user could utilize up/down, left/right, tap and buttons (similar to a laptop track pad, or smart phone screen) to generate the above control commands. Other embodiments may include a trackball or other type of input device.
- An accessory device may be used in conjunction with the glasses to generate the control commands. This device may take the form of a typical console controller, or even a gun shaped device (e.g., for action shooter type games).

Since the dual-mode glasses are essentially a mobile computing device, the device control commands become available to the console/PC, cloud or other device. These console control commands include: smart phone touch screen and (soft) keyboard, tilt, bank, motion (accelerometer, magnetometer, gyroscope), compass/direction, GPS/AGPS, and camera aiming. The user's head movements while wearing the glasses may be sensed via the gyroscopes, accelerometers, magnetometer, and the like. Such movements may also be translated into, and transmitted as, typical control commands mentioned above.

Feedback from the console/PC or cloud sent back to the glasses over the low latency connection may include necessary low latent feedback like a vibration signal sent to the device when the user might hit something when driving a car in a game.

Example dual-mode glasses utilize Wi-Fi, LTE, 3G, or future data connections for high bandwidth data transfer. Typical uses for data transfer include: 2nd (or 3rd, 4th, etc.) HUD type screen display on the glasses for a game being played where the 1st screen may be a TV or display connected to a console (or vice versa); metadata relevant to a game being played on the main console connected TV; soft controls (e.g., graphically display on the device screen) that change relevant to a level of a game; options available at certain points in a game; a game map that updates as the player moves, metadata relevant to a movie being watched on the main screen; mobile user profile storage; camera data obtained from the dual-mode glasses and used to map an area around the user based on his visual setting; sighting or aiming a real or virtual device (e.g., a weapon in a game); and 3D and/or motion sensing data obtained by or provided to the dual-mode glasses.

A microphone mounted in the glasses may be used to transfer voice to the console. Independent stereo sounds may be transferred to ear buds/speakers on the glasses. In some embodiments, dual-mode glasses may provide position dependent surround sound, which means depending on the position and direction of the glasses in an arena environment, the sound heard by the user through the glasses could be based on the direction, orientation and position in the arena of the user's glasses.

Accessories can be used in conjunction with glasses. Wireless accessories may include gun type devices to enable a user to engage in an action game by firing with a weapon in his hand, but utilizing the screen, and speakers located on the glasses for feedback.

The discussion of high and low latency connection protocols and processing described elsewhere herein is also generally applicable to dual-mode glasses. In addition, as dual-mode glasses may be used in conjunction with accessory controllers (e.g., a controller in the form factor of a gun or paddle), the accessory controllers themselves may have dual-mode communication capability. In other embodiments, the accessory controller may communicate only locally (e.g., using a low latency transmitter or transceiver) with the dual-mode eyeglasses, which are then responsible for forwarding control commands and other data received from the accessory to the console or other game host.

Figure 2F:
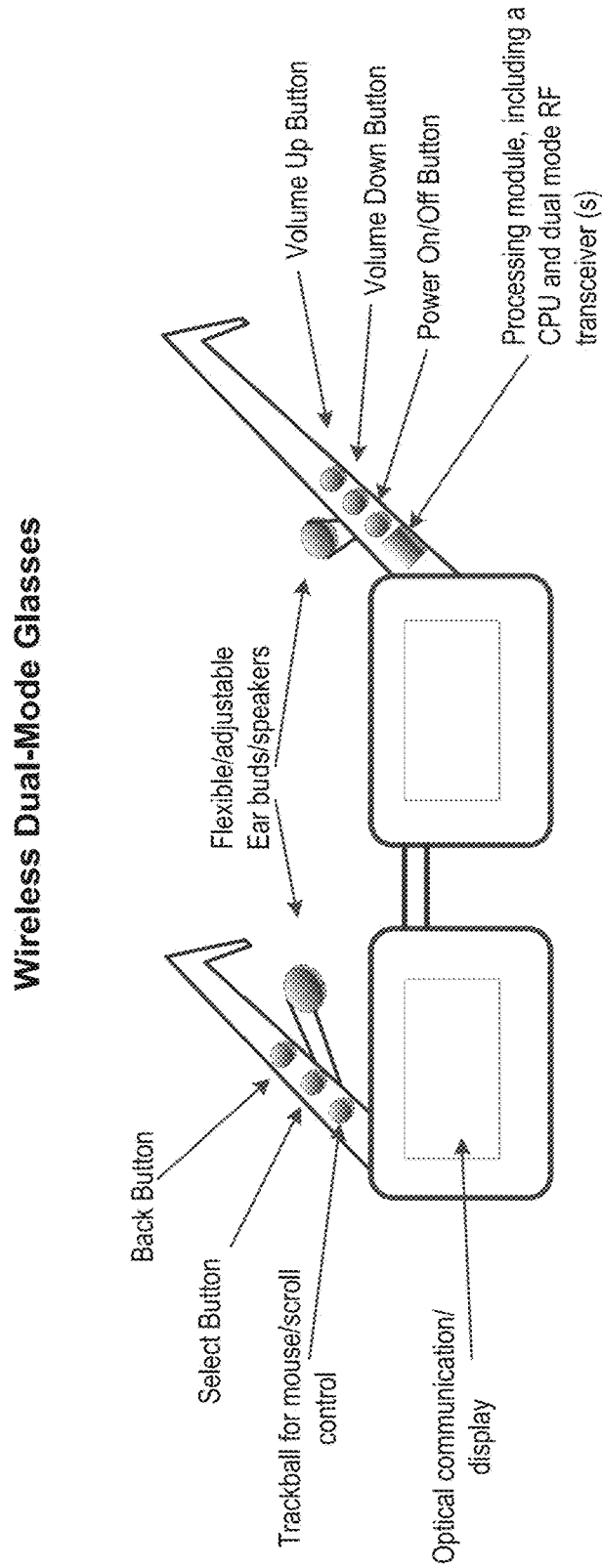
FIG. 2F illustrates example dual-mode eyeglasses according to an example embodiment.

FIG. 2F illustrates example dual-mode eyeglasses according to an example embodiment. The illustrated eyeglasses include a number of buttons, including a back button, a select button, volume up/down buttons, and a power on/off. The eyeglasses also include a trackball for mouse and/or scrolling control. The eyeglasses further include earbud speakers and a display in each of the eyepieces and processing module. The processing module includes a CPU and dual-mode RF transceivers. As noted, dual-mode eyeglasses are an example of a mobile device. Thus, the discussion with respect to FIG. 4 applies equally to the illustrated dual-mode eyeglasses and its component parts.

Other embodiments may include additional input/output devices and/or sensors that are not illustrated in FIG. 2F. For example, the eyeglasses may include position/orientation sensors, such as an accelerometer, GPS receiver, gyroscope, or the like. Some eyeglasses may include one or more cameras, such as a first camera facing outward and a second camera facing inward and trained on one or both eyes of the user. In addition, other types of controls may be used, such as a touch pad (e.g., instead of track ball), slider switch, or the like.

Dual-mode Communication in a Point of Service Environment

Figure 2G:
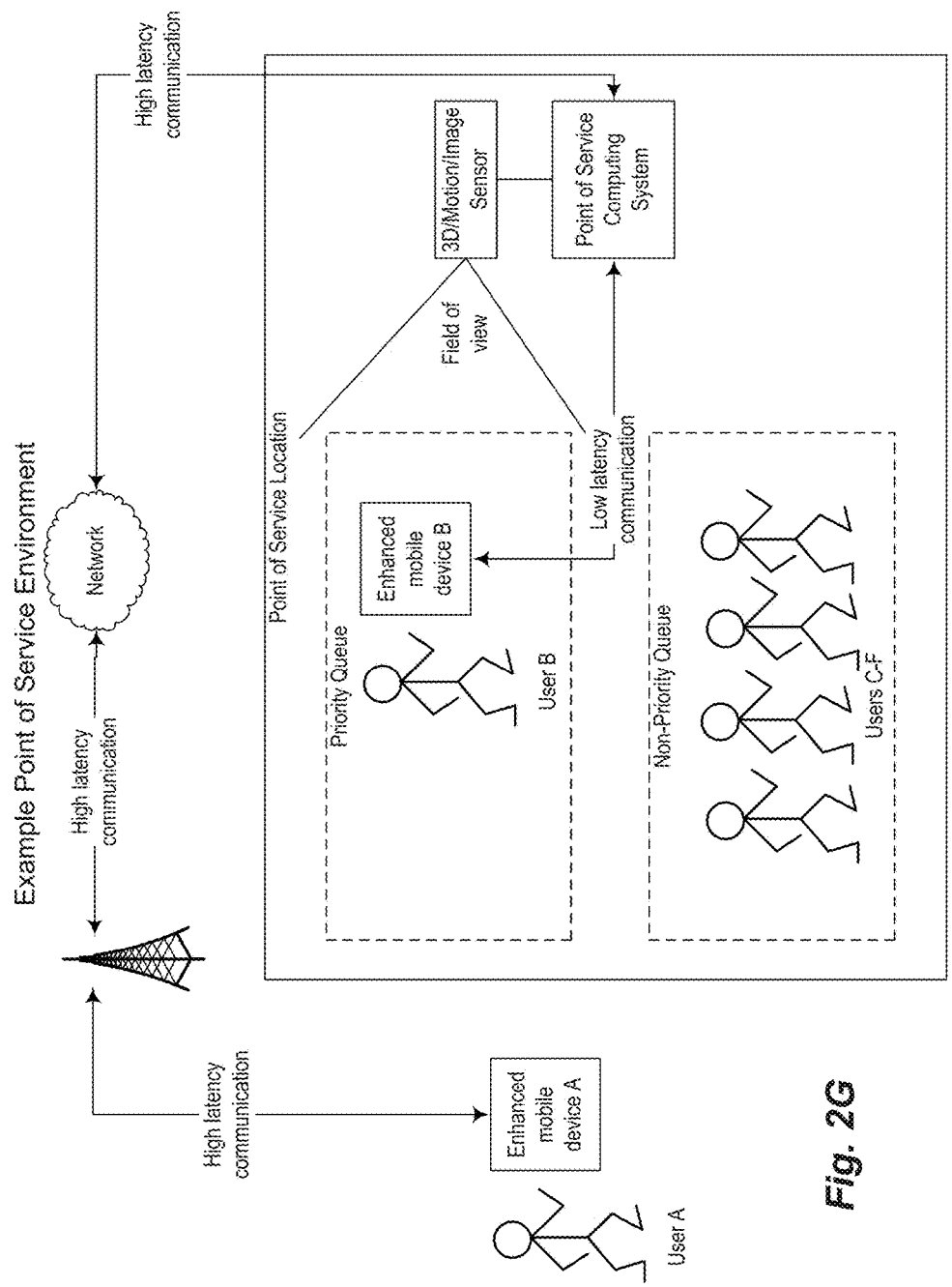
FIG. 2G illustrates an example point of service environment according to an example embodiment.

FIG. 2G illustrates an example point of service environment according to an example embodiment. More particularly, FIG. 2G shows an example point of service environment that includes a point of service location. A point of service location includes any physical location at which some service is offered, including a retail location (e.g., coffee shop, restaurant, clothing store), a service provider location (e.g., airline check-in counter, ticket window/counter, doctor's office, hospital intake facility), a government services office (e.g., licensing location, construction permit window), or the like. The location may be inside, outside, or both. For example, the location may include a drive up window for access by vehicle.

In the example of FIG. 2G, a first user (user A) operates an enhanced mobile device A to interact with a point of service computing system. The point of service computing system is an example of a host computing resource and is in communication with a 3D/motion/image sensor. The point of service computing system is shown at the point of service location. In other embodiments, some or all of the point of service computing system may be situated elsewhere, such as in a computing cloud or other network accessible location. The point of service computing system may be any computing system or resources that performs functions related to the service offered at the location. For example, in a restaurant or coffee shop scenario, the point of service computing system may be the order-taking and point of sale system used by that restaurant. At an airline check-in counter, the point of service computing system may be the reservation and check-in computing system used by the airline to track passengers, generate boarding passes, register luggage, and the like.

User A may operate his enhanced mobile device to interact with the point of service computing system prior to arriving at the point of service location. For example, user A may place an order, such as his favorite coffee order when leaving the house. As another example, user A may indicate that he is departing for, or en route to, the airport, hospital, doctor's office, or the like. Typically, this communication will take place via a high latency communication channel, as described herein.

In response to the advance communication received from user A's enhanced mobile device, the point of service computing system may initiate processes or functions prior to the arrival of user A. For example, the computing system may initiate the preparation of the user's order (e.g., coffee drink, menu selection, table allocation). In a health care setting, the computing system may order retrieval of medical records, schedule or reserve examination rooms, order drugs, or the like.

The 3D/motion/image sensor can be used to detect the arrival of a user at the location. For example, the sensor may detect a Bluetooth signal from the enhanced mobile device, thus uniquely identifying (or at least differentiating) the user. In addition, the sensor may determine other service related information, such as identifying or determining the number of persons arriving or traveling with user A, determining the arrival order of user A with respect to other users at the location, and the like.

Some embodiments provide multiple service queues, such as priority and non-priority queues. The priority queue holds customers who are using enhanced mobile device to provide advance notification of their arrival and/or requested service. The non-priority queue is for servicing customers who have not provided advance notification via an enhanced mobile device. In the example of FIG. 2G, user B is waiting in the priority queue. User B is operating enhanced mobile device B to interact with the point of service computing system via the low latency channel. For example, the device B can provide notification that user B has arrived at the location. As another example, the point of service computing system can provide information (e.g., menu selection, health records, flight itinerary) to the device B, so that the information can be confirmed or edited by user B prior to interaction with an employee or other service personnel.

In the following, a number of applications, scenarios, and use cases for a point of service embodiment are described. Techniques described with respect to one scenario may be equally employed in others. Note also that at least some of the techniques described below may also or instead be deployed without utilizing dual-mode technology.

In a first use case, a point of service embodiment ("ordering system") may be installed in a coffee shop, restaurant, or other retail establishment. In some cases, the ordering system may be deployed to facilitate the operation of a drive-through service window. The ordering system may be configured to automatically detect the presence of a customer's mobile device (e.g., when the customer enters the establishment) and to transmit ordering information (e.g., menu information) and/or controls to the mobile device. Then, the customer may use his mobile device to review and submit an order from a menu of items available for purchase at the establishment. The ordering system may include a motion/location sensor that can detect the location of the customer, so that the customer may simply seat himself and place his order, without needing to submit the order at a counter. Then, the ordering system informs a waiter or other employee of the customer's location (e.g., table), so that the employee can make delivery of the requested items. In addition, the ordering system may maintain records of the customer's name, favorite orders, likes, and dislikes. The described ordering system can increase service throughput (e.g., number of orders processed per unit time) and latency (e.g., average wait time). The ordering system can also increase customer satisfaction, due to the personalized services that can be offered. The described ordering system may in some embodiments not use or rely upon dual-mode communication, such as by not using the low latency communication channel for functions such as customer detection, ordering, and the like, and instead performing such functions via a high latency channel such as WiFi, 3G, or 4G.

In some embodiments, the customer mobile device executes an application ("app") that is specific to the particular restaurant or other service provider. As the customer approaches the order window or till, the system will recognize that customer through dual-mode technology and load their previous order purchases or profile. In this way, the associate can prompt the customer if they want their usual order. Alternatively, the customer could have already predetermined their order, and the cashier would know the customer is approaching and just say "pull forward, your order is already ready." This process could also be automated on the customer side by using text to speech and voice to text services. For example, the customer may be prompted as they get within range to say whether they want their usual order. If so, they can pull directly up to the window to receive their product or enter a "priority" line at the facility if their order was already filled. In this manner, the whole interaction can be hands free.

As noted, some embodiments may utilize dual-mode connectivity to provide an enhanced customer experience through Bluetooth, Wi-Fi and possibly 3D/motion/image sensing (e.g., Xbox Kinect) systems to detect when consumer is in range, and in turn prompt them on their device before they get to the order window. With several customers in line using the app, the cashier would know the current and upcoming orders based on position of the mobile devices in relation to the base sensor. As also noted, some embodiments may not utilize a low latency communication channel, and instead perform communication with the customer device only via a high latency channel.

In addition, the described app can use Location Based Services when not in Bluetooth range. For example, in a scenario where the customer wants a certain type of coffee drink, the customer can order the drink through the app when they are leaving their home in the morning. Because the app knows the customer's location and how long it will take before the customer arrives at their preferred coffee shop, the coffee shop employee knows when to start making the drink so that it is ready when the customer arrives.

Some embodiments may provide a dynamic menu that is modified based on the travel time between the current location of the customer and the point of service location (e.g., coffee shop, restaurant). In one embodiment, the point of service computing system (or some other module, possibly even executing on the customer mobile device) determines a set of items that can be prepared within the travel time between a customer's current location and the point of service location. This set of items is then transmitted to and presented on the customer mobile device as being available for "instant service"—that is, being available upon the arrival of the customer at the point of service location. As the customer travels towards the point of service location, the set of available items is modified (typically reduced) based on the shortened travel time. The modified set of items is then presented on the customer mobile device. The mobile device may also present indications of items that are no longer available for "instant service," annotated with a wait time that is based on the difference between the item preparation time and the travel time. For example, if an item takes 10 minutes to prepare and the travel time is 8 minutes, the item may be shown on the customer mobile device as having a +2 minute wait time, meaning that it can be ready within 2 minutes of the arrival of the customer.

The following scenario illustrates operation of the described dynamic menu. Suppose a restaurant offers items A, B, and C having preparation times of 5, 10, and 12 minutes, respectively. When the customer is 15 minutes away from the restaurant, the dynamic menu will show all three items as being available for instant service. As the customer travels towards the restaurant the dynamic menu is automatically updated based on the shortened remaining travel time. For instance, when the customer is 8 minutes away from the restaurant, only item A will be shown as being available for instant service (due to its 5 minute preparation time), while items B and C will be shown as respectively having 2 and 7 minute wait times.

In a second use case, a point of service embodiment is deployed to facilitate the operation of a drive-through line. In this example, multiple customers in the drive-through are using the described app on their enhanced mobile devices to place orders. It may be difficult for the ordering system to determine the exact order of customers in line, for example due to atmospheric or signal interference, because some customers have disabled Bluetooth, or the like.

The above problem can be addressed via a 3D/motion/image sensor that is used to read license plates of cars in line, By matching the license plates to information stored in the customers' profiles, a correct order of cars in line can be determined and each customer's request can be processed in the correct order. Even if license plates cannot be stored in the customers' app profiles (e.g., for privacy concerns) the 3D/motion/image sensor may still be used to determine the car make, model and color. The car details may then be matched to previously stored customer profile information, such as may have been provided by the customer (e.g., entered into the app) or determined based on an image captured during a previous visit.

In a third use case, multiple customers are in line for a cashier in a non drive-through setting. By using the 3D/motion/image sensor in a similar manner as the second use case (above) to associate the stored customer photo/image and attributes with their existing profile and determine the location of each mobile device associated with each customer via the retail app, the system can sort order customers and automatically associate them to previously ordered product or service with no cashier interaction.

In a fourth use case, the ordering system may differentiate between different orders for a single customer in a drive-through or walk-up scenario. For example, there may be different orders associated with a person depending on the setting or purpose of the trip. In the mornings, a person may order coffee or food only for themselves, whereas in the afternoon, when the kids are being driven to soccer, that person may place an order for the whole family. The ordering system can differentiate between these orders by using a 3D/motion/image sensor to detect how many people, and even which people are in the car (e.g., mom and her three kids vs. mom and her three friends) in order to correctly suggest the customer's order. Via dual-mode technology, the system can also refine exactly which three people are in the car by identifying the mobile devices present in the car and cross-referencing how many people are present in the car. Again, even though the customer will be prompted on her mobile device to confirm the order via dual-mode technology, the entire transaction can also take place hands free via text-to-speech and speech-to-text services.

In a fifth use case, a point of service embodiment is deployed in a health care setting. The following problem can be addressed: It is the weekend and a patient's primary care physician is not available. Unfortunately the patient has developed an ailment and must see a physician at urgent care or the emergency room. The intake line is very long, and patient has to take a number for service. In order to speed the intake process, the patient could open their health care app, add the symptoms they are experience, and start their commute to the urgent care facility. Via Location Based Services, the facility is notified that the patient is inbound and of the patient's estimated time of arrival, so that the facility can prepare and prioritize. Once the patient arrives, the urgent care facility is notified that the patient is present via dual-mode technology. There is no need for the extensive intake process and the patient is notified of his place in the queue relative to other patients. As discussed above, the patient may enter a priority queue at the facility. Also, the patient can interact real time with the facility via dual-mode technology. Eventually, the patient is notified via phone or other signal when the doctor is available to see them.

In a sixth use case, a point of service embodiment is deployed in a government service setting, such as the department of motor vehicles. In this approach, a customer is able to queue in line for service before he leaves his house. The system is automatically updated as to the arrival of the customer while he is en route and upon arrival at the facility. There is no need for the extensive intake process as the customer would have a department of motor vehicles profile attached to the app and will have already preselected what options they require (thus the advanced queuing) and the customer is always aware of their place in the queue relative to other customers. The customer can interact real time with the facility via dual-mode and they are notified via dual mode when the department of motor vehicles technician is available to see them. In a slightly modified dual-mode scenario, if the customer were to take their car to get emissions tested, by utilizing the dual-mode enable app, the customer could register remotely. Via Location Based Services the department of motor vehicles system would know how far away the customer is and queue them appropriately. The customer could then enter a "priority" line at the facility in which they would be quickly recognized via 3D/motion/image sensing and/or dual-mode technology.

In a seventh use case, a point of service embodiment is deployed at a restaurant. Many of the above-described techniques are advantageous in the restaurant setting as well. For example, a diner may then enter a "priority line at the restaurant because they launched the restaurant app remotely, were queued by their position via Location Based Services, and then are quickly recognized via 3D/motion/image sensing and dual-mode technology. With dual-mode communication, the diner has the added benefit of being able to order real-time from the restaurant's menu while waiting for a table.

Example Processes

FIGS. 3.1-3.10 are example flow diagrams of processes performed by example embodiments. The following flow diagrams illustrate dual-mode communication processes performed by point of service embodiments.

FIG. 3.1 is an example flow diagram of example logic for providing a service at a point of service location. The illustrated logic in this and the following flow diagrams may be performed by, for example, the mobile device 400 and/or the point of service computing system described with respect to FIG. 3G, above. More particularly, FIG. 3.1 illustrates a process 3100 that includes operations performed by or at the following block(s).

At block 3101, the process performs managing a point of service dual-mode communication environment that includes a point of service computing system and a mobile device that is operated by a corresponding customer and that includes a low latency transceiver and a high latency transceiver, by: performing operation(s) of block(s) 3102, 3103 and 3104, described below.

At block 3102, the process performs receiving an indication that the customer is en route to the point of service location, the indication received from the mobile device via its high latency transceiver. In some embodiments, the customer has an application ("app") installed on his mobile device. He may use that app to indicate that he is en route, and the indication will be transmitted to the process via the high latency transceiver.

At block 3103, the process performs determining that the customer has arrived at the point of service location, based at least in part on data received from the mobile device via the low latency transceiver. The mobile device may transmit via the low latency transceiver an indication that the customer has arrived. In addition, the point of service computing system may include a 3D/motion/image sensor that is used to identify the customer.

At block 3104, the process performs providing a service based on the received indication and the received data. Providing the service may include providing or processing any type of physical or virtual service or transaction, including any of an item purchase, a financial transaction, a food or drink order, a health care service, a government agency service, an airline or other transportation service, a ticketing service, a check-in service, a social networking service, and the like.

FIG. 3.2 is an example flow diagram of example logic illustrating an example embodiment of process 3100 of FIG. 3.1. More particularly, FIG. 3.2 illustrates a process 3200 that includes the process 3100, and which further includes operations performed by or at the following block(s).

At block 3201, the process performs in response to the receiving an indication that the customer is en route to the point of service location, estimating arrival time of the user at the point of service location. The arrival time may be estimated based on location based services. The estimated arrival time may be used to schedule resources and/or prepare an order to serve the customer.

FIG. 3.3 is an example flow diagram of example logic illustrating an example embodiment of process 3100 of FIG. 3.1. More particularly, FIG. 3.3 illustrates a process 3300 that includes the process 3100, and which further includes operations performed by or at the following block(s).

At block 3301, the process performs in response to the receiving an indication that the customer is en route to the point of service location, determining an order for the customer by looking up a preferred order associated with the customer. Once the process learns that the customer is en route, the process may look up the customer's preferred order, such as a previously served or specified order. The process may then schedule the processing of that order, such as by entering it into the processing queue associated with the location.

FIG. 3.4 is an example flow diagram of example logic illustrating an example embodiment of process 3100 of FIG. 3.1. More particularly, FIG. 3.4 illustrates a process 3400 that includes the process 3100, and which further includes operations performed by or at the following block(s).

At block 3401, the process performs in response to the receiving an indication that the customer is en route to the point of service location, allocating or scheduling resources to process an order for the customer. This operation may include directing a food preparer to begin to prepare a food or drink order; calling a doctor or nurse; allocating an examination room; assigning a seat, room, or ticket; registering luggage; or the like.

FIG. 3.5 is an example flow diagram of example logic illustrating an example embodiment of process 3100 of FIG. 3.1. More particularly, FIG. 3.5 illustrates a process 3500 that includes the process 3100, and which further includes operations performed by or at the following block(s).

At block 3501, the process performs determining, based on a motion/image sensor, the position of the customer relative to other customers at the location. When multiple customers are using mobile devices according to the described techniques, the process may determine their order in line based on a motion and/or image sensor and/or based on signals received via low latency transceivers.

At block 3502, the process performs arranging orders associated with the customers based on the determined position.

FIG. 3.6 is an example flow diagram of example logic illustrating an example embodiment of process 3100 of FIG. 3.1. More particularly, FIG. 3.6 illustrates a process 3600 that includes the process 3100, and which further includes operations performed by or at the following block(s).

At block 3601, the process performs identifying one or more persons that are traveling with the customer, the identifying based on an image sensor and/or data received from low latency communications received from mobile devices associated with the one or more persons. For example, image recognition may be used to determine whether and how many other people are present with the customer. By determining whether others are present, the process may more accurately select an order associated with the customer.

At block 3602, the process performs in response, determining an order based on the number and identity of the customer and the one or more persons.

FIG. 3.7 is an example flow diagram of example logic illustrating an example embodiment of process 3100 of FIG. 3.1. More particularly, FIG. 3.7 illustrates a process 3700 that includes the process 3100, and which further includes operations performed by or at the following block(s).

At block 3701, the process performs identifying a vehicle operated by the customer, the identifying including image processing to determine a license plate number and/or to determine the make, model, and/or color of the vehicle. For example, image recognition may be used to identify the license plate and/or other vehicle details. This information can be used to order or schedule requests, such as when multiple different parties are in a queue but their order cannot be definitively determined.

At block 3702, the process performs in response, determining an order based on the vehicle operated by the customer.

FIG. 3.8 is an example flow diagram of example logic illustrating an example embodiment of process 3100 of FIG. 3.1. More particularly, FIG. 3.8 illustrates a process 3800 that includes the process 3100, and which further includes operations performed by or at the following block(s).

At block 3801, the process performs in response to the determining that the customer has arrived at the point of service location, assigning the customer to a priority service queue. As discussed, some embodiments assign or direct the customer to a priority queue that is reserved for customers who have notified the service of their departure, travel, or arrival according to the described techniques.

FIG. 3.9 is an example flow diagram of example logic illustrating an example embodiment of process 3100 of FIG. 3.1. More particularly, FIG. 3.9 illustrates a process 3900 that includes the process 3100, and which further includes operations performed by or at the following block(s).

At block 3901, the process performs receiving via the low latency transceiver an order and/or order confirmation from the customer. As the customer is waiting or as the customer arrives as the location, the customer may confirm or place his order via the low latency transceiver.

FIG. 3.10 is an example flow diagram of example logic for providing a service at a point of service location. The illustrated logic in this and the following flow diagrams may be performed by, for example, the mobile device 400 and/or the point of service computing system described with respect to FIG. 3G, above. More particularly, FIG. 3.10 illustrates a process 31000 that includes operations performed by or at the following block(s).

At block 31001, the process performs managing a point of service environment that includes a point of service computing system, a motion/image sensor, and a mobile device that is operated by a corresponding customer, by: performing operation(s) of block(s) 31002, 31003 and 31004, described below.

At block 31002, the process performs receiving an indication that the customer is en route to the point of service location, the indication received from the mobile device. In some embodiments, the customer has an application ("app") installed on his mobile device. He may use that app to indicate that he is en route, and the indication will be transmitted to the process, such as via a WiFi network, a telephony network, or the like.

At block 31003, the process performs determining that the customer has arrived at the point of service location, based at least in part on data received from the motion/image sensor. The motion/image sensor may be used to identify the customer, the customer's vehicle, or other information, such as the position of the customer in line relative to other customers, the number of customers in line, and the like.

At block 31004, the process performs providing a service based on the received indication and the received data. Providing the service may include providing or processing one or more of: an item purchase, a financial transaction, a food or drink order, a health care service, a government agency service, an airline or other transportation service, a ticketing service, a check-in service, a social networking service, and the like.

Example Computing System Implementation

Figure 4:
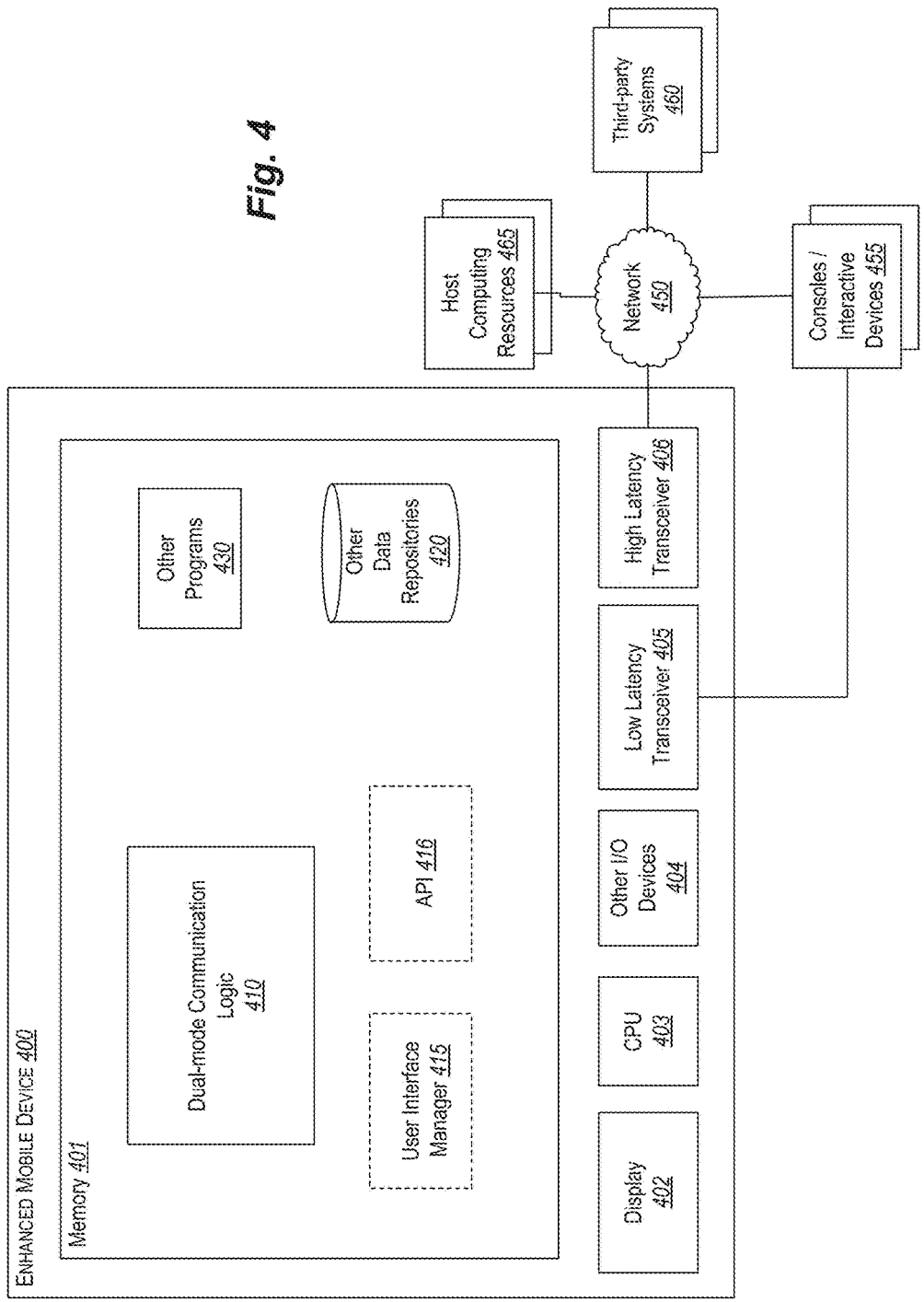
FIG. 4 is an example block diagram of an example computing system for implementing example embodiments.

FIG. 4 is an example block diagram of an example computing system for implementing example embodiments. In particular, FIG. 4 shows an enhanced mobile device 400 that may be utilized as the enhanced mobile device described with respect to FIG. 1. Note that a general purpose or special purpose computing system/processor, suitably instructed, may be used to implement (or as part of) mobile device 400. In addition the techniques and modules described below may be used to implement other described system components, such as gaming servers, point of service systems, and the like.

In the embodiment shown, mobile device 400 comprises a computer memory ("memory") 401, a display 402, one or more Central Processing Units ("CPU") 403, Input/Output devices 404 (e.g., keyboard, touch screen, GPS receiver, accelerometer, position sensor, and the like), a low latency transceiver 405, and high latency transceiver 406. Dual-mode communication logic 410 is shown residing in memory 401. In other embodiments, some portion of the contents, some or all of the components of the logic 410 may be stored on and/or transmitted over the other computer-readable media 405. The logic 410 and any related components preferably execute on one or more CPUs 403 to perform the techniques or functions described herein. Other code or programs 430 (e.g., gaming apps, video streaming apps, and the like) and potentially other data repositories, such as data repository 420, also reside in the memory 401, and preferably execute on one or more CPUs 403. Note that one or more of the components in FIG. 4 may not be present in any specific implementation.

The mobile device 400 interacts with the interactive devices 455 (e.g., gaming consoles, set-top boxes) via the low latency transceiver 405 and via the high latency transceiver 406. In the illustrated embodiment, the communication via the low latency transceiver 405 is direct. In other words, it does not pass through any intermediate systems or devices. In contrast, the communication via the high latency transceiver 406 is indirect, in that it passes through the network 450. Note also that in some embodiments, the device 400 may not be capable of receiving data via a low latency connection. In such cases, the device 400 would have a transmitter in place of the low latency the low latency transceiver 405. Furthermore, the device 400 may also or instead have one or more low latency connections to the interactive devices 455 via a wired connection, such as a USB cable. Note that while consoles are sometimes used as examples, the functions of a console may equivalent be incorporated or implemented within a different form factor, such as within a smart television, an all-home entertainment system, a distributed system, or the like.

The network 450 may be or include the Internet and/or any networks used to provide IP-based communication, such as a network based on Wi-Fi, Wi-Di, WiMAX, 3G, 4G, or the like. Wi-Fi may be based on standards such as IEEE 802.11b, 802.11g, 802.11n over 2.4 GHz, 3.6 GHz, 5 GHz, or other frequencies. Wi-Di may be or include WirelessHD protocols. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The mobile device 400 may also interact via the network 450 with host computing resources 465 and third-party systems/applications 460. The host computing resources 465 may include point of service systems, including servers or systems that are used to provide a service at some location, as described with respect to FIG. 3G, above. In other embodiments, the host computing resources 465 may include gaming servers configured to provide or manage an arena gaming environment. The third-party systems 460 may include servers or systems used for content distribution (e.g., media streaming servers, online music stores, Web servers), application distribution (e.g., app stores), or the like.

The logic 410 is shown executing in the memory 401 of the mobile device 400. Also included in the memory are a user interface manager 415 and an application program interface ("API") 416. The user interface manager 415 and the API 416 are drawn in dashed lines to indicate that in other embodiments, functions performed by one or more of these components may be performed externally to the logic 410.

The logic 410 performs functions described herein. For example, the logic 410 may format data for communication via the transceivers 405 and 406. As another example, the logic 410 may automatically determine which of the transceivers 405 and 406 to utilize, based on information about the data being transmitted (e.g., type, amount, priority), information about the communication medium (e.g., whether the link is saturated or not, link utilization level), information about the receiver (e.g., requirements of the interactive device 455), or the like.

The UI manager 415 provides a view and a controller that facilitate user interaction with the logic 410 and its various components. For example, the UI manager 415 may provide interactive access to the logic 410, so that uses can configure the operation of the dual-mode communication capability of the mobile device 400.

The API 416 provides programmatic access to one or more functions of the logic 410. For example, the API 416 may provide a programmatic interface to one or more functions of the logic 410 that may be invoked by one of the other programs 430 or some other module. In this manner, the API 416 facilitates the development of third-party software, such as user interfaces, plug-ins, adapters (e.g., for integrating functions of the logic 410 into mobile applications), and the like.

In addition, the API 416 may be in at least some embodiments invoked or otherwise accessed via remote entities, the host computing resources 465, the interactive devices 455, and/or the third-party systems/applications 460, to access various functions of the logic 410. For example, the interactive device 455 may select a preferred communication frequency or channel (or set other parameters) with respect to the low latency transceiver 405 via the API 416.

In an example embodiment, components/modules of the logic 410 are implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the logic 410, such as in the data store 420, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the logic 410 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. Patent Application No. 61/667,261, filed on Jul. 2, 2012 and U.S. patent application Ser. No. 13/934,035, filed on Jul. 2, 2013, both entitled "DUAL-MODE COMMUNICATION DEVICES AND METHODS FOR COMMUNICATING WITH AN ENTERTAINMENT SYSTEM;" U.S. Patent Application No. 61/675,211, filed on Jul. 24, 2012 and U.S. patent application Ser. No. 13/934,039, filed on Jul. 2, 2013, both entitled "DUAL-MODE COMMUNICATION DEVICES AND METHODS FOR ARENA GAMING;" U.S. Patent Application No. 61/682,668, filed on Aug. 13, 2012 and U.S. patent application Ser. No. 13/934,041, filed on Jul. 2, 2013, both entitled "DUAL-MODE EYEGLASSES;" and U.S. Patent Application No. 61/869,000, filed Aug. 22, 2013 and U.S. patent application Ser. No. 14/466,777, filed on Aug. 22, 2014, both entitled "DUAL-MODE COMMUNICATION DEVICES AND METHODS" are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for dual-mode communication are applicable to other architectures or in other settings. For example, at least some of the techniques may be employed in an educational setting, so that a classroom of students may interact with a teacher and/or educational system in a classroom or distributed setting. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for providing a service at a point of service location, the method comprising:
managing a point of service dual-mode communication environment that includes a point of service computing system and a mobile device that is operated by a corresponding customer and wherein the mobile device includes a low latency transceiver and a high latency transceiver, by:
receiving an indication that the customer is en route to the point of service location, the indication received from the mobile device via its high latency transceiver;
in response to the receiving the indication that the customer is en route to the point of service location, determining an order for the customer by looking up an order predetermined by the customer, wherein the interaction between the customer and the point of service computing system for determining the order is hands free;
determining that the customer has arrived at the point of service location, based at least in part on data received from the mobile device via the low latency transceiver; and
providing a service based on the received indication, the received data, and the determined order.

2. The method of claim 1, further comprising: in response to the receiving an indication that the customer is en route to the point of service location, estimating arrival time of the user at the point of service location.

3. The method of claim 1, wherein determining the order for the customer by looking up the order determines the order by looking up a preferred order associated with the customer and scheduling processing of the determined order.

4. The method of claim 1, further comprising: in response to the receiving an indication that the customer is en route to the point of service location, allocating or scheduling resources to process an order for the customer.

5. The method of claim 1, further comprising:
determining, based on a motion/image sensor, the position of the customer relative to other customers at the location; and
arranging orders associated with the customers based on the determined position.

6. The method of claim 1, further comprising:
identifying one or more persons that are traveling with the customer, the identifying based on an image sensor and/or data received from low latency communications received from mobile devices associated with the one or more persons; and
in response, modifying the order based on the number and identity of the customer and the one or more persons.

7. The method of claim 1, further comprising:
identifying a vehicle operated by the customer, the identifying including image processing to determine a license plate number and/or to determine the make, model, and/or color of the vehicle; and wherein the order is based on the vehicle operated by the customer.

8. The method of claim 1, further comprising: in response to the determining that the customer has arrived at the point of service location, assigning the customer to a priority service queue.

9. The method of claim 1, further comprising: in response to the determining that the customer has arrived at the point of service location, confirming an order with the customer via the low latency transceiver.

10. The method of claim 1, further comprising: receiving via the low latency transceiver an order and/or order confirmation from the customer.

11. The method of claim 1, wherein the providing a service includes: providing or processing at least one of: an item purchase, a financial transaction, a food or drink order, a health care service, a government agency service, an airline or other transportation service, a ticketing service, a check-in service, or a social networking service.

12. The method of claim 1, wherein the receiving an indication that the customer is en route to the point of service location includes: receiving a message from the mobile device via IP communication.

13. The method of claim 1, wherein the providing a service includes: receiving a message from the mobile device via the Internet.

14. The method of claim 1, wherein the determining that the customer has arrived at the point of service location includes: receiving a message from the mobile device via a 2.4 gigahertz communication link.

15. The method of claim 1, wherein the determining that the customer has arrived at the point of service location includes: receiving a message from the mobile device via a communication connection that has a latency of less than 15 milliseconds.

16. A system for providing a service at a point of service location, the system comprising:
    a point of service computing system; and
    multiple mobile devices that are each operated by a corresponding customer and that each include a low latency transceiver, a high latency transceiver, and a module that is configured to:
        communicate first data with the point of service computing system via its high latency transceiver, the first data including an indication that the customer is en route to the point of service location; and
        communicate second data with the point of service computing system via its low latency transceiver, wherein the second data includes an indication that the customer has arrived at the point of service locations;
    wherein the point of service computing system in response to receiving the first data from a mobile device that includes the indication that a corresponding customer is en route to the point of service location, determines an order for the corresponding customer by looking up an order predetermined by the customer, wherein the interaction between the customer and the point of service computing system for determining the order is hands free.

17. The system of claim 16, wherein the multiple mobile devices are each one of a smart phone or a tablet computer.

18. The system of claim 16, wherein the point of service computing system includes a motion sensor that is configured to track position and movement of users of the multiple mobile devices, and wherein the point of service computing system is configured to, upon receiving from one of the mobile devices an indication that the customer has arrived at the point of service location, transmit ordering information to the one mobile device via the high latency transceiver of the one mobile device.

19. The system of claim 16, wherein the low latency transceiver includes at least one of a 2.4 gigahertz transmitter with a latency of less than 10 milliseconds, a Bluetooth transceiver, a transceiver with a maximum range of about 10 meters.

20. The system of claim 16, wherein the high latency transceiver communicates with the point of service computing system via at least one of IP communication, a Wi-Fi connection, a 3G connection, a 4G connection, and/or an LTE connection.

* * * * *

UNITED STATES PATENT AND TRADEMARK OFFICE
CERTIFICATE OF CORRECTION

| | | |
|---|---|---|
| PATENT NO. | : 10,027,361 B2 | Page 1 of 1 |
| APPLICATION NO. | : 15/693459 | |
| DATED | : July 17, 2018 | |
| INVENTOR(S) | : Kevin Griffin | |

It is certified that error appears in the above-identified patent and that said Letters Patent is hereby corrected as shown below:

In the Claims

In Column 26, Line 9 (Claim 16), "locations" should be --location--.

Signed and Sealed this
Fourth Day of September, 2018

Andrei Iancu
*Director of the United States Patent and Trademark Office*